(12) United States Patent
Hofrichter et al.

(10) Patent No.: US 10,312,978 B2
(45) Date of Patent: Jun. 4, 2019

(54) WIRELESS TRANSCEIVER STATION WITH PERFORMS MULTI-PATH RECIPROCITY CALIBRATION WITH MULTIPLE REFERENCE ANTENNAS

(71) Applicant: National Instruments Corporation, Austin, TX (US)

(72) Inventors: Jörg Hofrichter, Dresden (DE); Michael Löhning, Dresden (DE); Eckhard Ohlmer, Dresden (DE)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 16/036,372

(22) Filed: Jul. 16, 2018

(65) Prior Publication Data

US 2019/0028155 A1   Jan. 24, 2019

Related U.S. Application Data

(60) Provisional application No. 62/534,130, filed on Jul. 18, 2017.

(51) Int. Cl.
*H04W 52/08*   (2009.01)
*H04B 7/0417*   (2017.01)
(Continued)

(52) U.S. Cl.
CPC ........... *H04B 7/0417* (2013.01); *H01Q 1/241* (2013.01); *H04B 1/40* (2013.01); *H04L 1/0009* (2013.01)

(58) Field of Classification Search
CPC ... H04W 88/085; H04W 52/08; H04B 7/0617
(Continued)

(56) References Cited

U.S. PATENT DOCUMENTS

| | | | | |
|---|---|---|---|---|
| 4,864,309 A | * | 9/1989 | Wiley | G01K 11/006 342/351 |
| 8,193,971 B2 | | 6/2012 | Vook et al. | |

(Continued)

OTHER PUBLICATIONS

Vieira et al., "*Reciprocity Calibration Methods for Massive MIMO Based on Antenna Coupling*", Department of Electrical Engineering, Lund University, Jan. 1, 2014, pp. 1-6.
(Continued)

*Primary Examiner* — William D Cumming
(74) *Attorney, Agent, or Firm* — E. Alan Davis; James W. Huffman

(57) ABSTRACT

In a wireless transceiver station having M antennas, designate an antenna as a target reference antenna (TRA) and for each antenna m other than the TRA: define N distinct paths from antenna m to TRA through zero or more intermediate reference antennas, N is two or more, each distinct paths has a distinct associated set of one or more antenna pairs; for each antenna pair of the sets, estimate an effective forward and backward channel response by sending calibration pilots forth and back between the antenna pair and calculate a reciprocity coefficient for the antenna pair using the estimated channel responses; for each of the N distinct paths, calculate a reciprocity coefficient estimate using the reciprocity coefficients calculated for the set of antenna pairs associated with the path; and combine the N calculated reciprocity coefficient estimates to produce a final reciprocity coefficient estimate for antenna pair (m, target reference antenna).

20 Claims, 11 Drawing Sheets

(51) Int. Cl.
*H01Q 1/24* (2006.01)
*H04L 1/00* (2006.01)
*H04B 1/40* (2015.01)

(58) Field of Classification Search
USPC ...................................... 370/516; 455/575.7
See application file for complete search history.

(56) References Cited

U.S. PATENT DOCUMENTS

| | | | |
|---|---|---|---|
| 8,325,755 B2 | 12/2012 | Lee et al. | |
| 8,417,191 B2* | 4/2013 | Xia | H04B 7/0617 342/368 |
| 9,191,161 B2 | 11/2015 | Li et al. | |
| 9,548,806 B2* | 1/2017 | Kim | H04B 7/086 |
| 10,091,740 B2* | 10/2018 | Shin | H04W 52/08 |
| 10,096,909 B2* | 10/2018 | Schwartzman | H01Q 9/36 |
| 10,097,234 B2* | 10/2018 | He | H04B 1/525 |
| 10,103,774 B1* | 10/2018 | Moorti | H04B 1/123 |
| 10,110,270 B2* | 10/2018 | Branlund | H04B 1/40 |
| 10,110,308 B2* | 10/2018 | Harel | H04B 1/40 |
| 10,118,696 B1* | 11/2018 | Hoffberg | B64C 39/001 |
| 10,128,951 B2* | 11/2018 | Casterline | H04B 10/25754 |
| 10,135,499 B2* | 11/2018 | Stratigos, Jr. | H04L 27/06 |
| 10,135,508 B2* | 11/2018 | Won | H04B 7/0413 |
| 10,135,533 B2* | 11/2018 | Hazani | H04B 10/25753 |
| 10,136,200 B2* | 11/2018 | Cune | H04B 10/25754 |
| 10,136,404 B2* | 11/2018 | Tujkovic | H04B 7/0413 |
| 10,141,959 B2* | 11/2018 | Saban | H04W 88/085 |
| 10,142,001 B2* | 11/2018 | Ling | H04B 7/0617 |
| 10,142,082 B1* | 11/2018 | Shattil | H04L 27/2613 |
| 2005/0030021 A1* | 2/2005 | Prammer | G01N 24/081 324/303 |
| 2010/0150013 A1 | 6/2010 | Nara et al. | |
| 2011/0263280 A1 | 10/2011 | Guey | |
| 2015/0071310 A1* | 3/2015 | Kim | H04B 7/086 370/516 |
| 2015/0222336 A1 | 8/2015 | Yilmaz et al. | |
| 2015/0326286 A1 | 11/2015 | Wong et al. | |
| 2015/0326291 A1 | 11/2015 | Wong et al. | |
| 2015/0326383 A1 | 11/2015 | Wong et al. | |
| 2016/0308624 A1 | 10/2016 | Rong et al. | |
| 2017/0290013 A1 | 10/2017 | McCoy et al. | |
| 2018/0048361 A1 | 2/2018 | Kundargi et al. | |
| 2018/0048492 A1 | 2/2018 | Kundargi et al. | |
| 2018/0091207 A1 | 3/2018 | Kakishima et al. | |
| 2018/0337717 A1* | 11/2018 | Nasiri Khormuji | H04B 7/0417 |
| 2018/0338321 A1 | 11/2018 | Shepard et al. | |
| 2019/0028155 A1* | 1/2019 | Hofrichter | H04B 7/0417 |

OTHER PUBLICATIONS

Harris et al., "University of Bristol and Lund University Partner with NI to Set World Records in 5G Wireless Spectral Efficiency Using Massive MIMO", dowloaded from www.ni.com, May 2016, pp. 1-7.
"LTE in a Nutshell—Physical Layer", Telesystem Innovations Inc. White Paper, 2010, pp. 1-10.
"An Introduction to Orthogonal Frequency Division Multiplex Technology", Keithley Instruments, Inc., 2008, pp. 1-66.
Huawei, "WF on CSI Acquisition in NR", 3GPP TSG RAB WG1 Meeting #85, May 23-27, 2016, pp. 1-4.
Huawei et al., "WF on CSI Acquisition Framework in NR", 3GPP TSG RAN WG1 Meeting #85, May, 23-27, 2016, pp. 1-3.
"Study on Latency Reduction Techniques for LTE", 3GPP TR 36.881 Vo.6.0 Technical Report, Feb. 2016, pp. 1-92.
"Study on Scenarios and Requirements for Next Generation Access Technologies", 3GPP TR 38.913 Vo.2.0, Feb. 2016, pp. 1-19.
Vieira et al., "A Flexible 100-Antenna Testbed for Massive MIMO", Department of Electrical Information Technology at Lund University, Jan. 1, 2014, pp. 1-7.
"Bristol and Lund Set a New World Record in 5G Wireless Spectrum Efficiency" Bristol Univeristy, News, March: Massive MIMO demonstration, Mar. 23, 2016, pp. 1-6.
"Study on NR New Radio Access Technology", 3GPP TSG RAN Meeting #71, Goteborg, Sweden, Mar. 7-10, 2016, pp. 1-8.
"LTE Small Cell Enhancement by Dual Connectivity", Wireless World Research Forum, Outlook Visions and Research Directions for the Wireless World, Whitepaper, Nov. 2014, pp. 1-22.
"LTE in a Nutshell: Protocol Architecture" Telesystem Innovations Inc. White Paper, 2010, pp. 1-12.
"LTE Random Access Procedure" http://www.eventhelix.com/eventstudio/, Jul. 28, 2017, pp. 1-5.
Luther, "5G Massive MIMO Testbed: From Theory to Reality", National Instruments, Jun. 8, 2016, pp. 1-11.
"Introduction to the NI mmWave Transceiver System Hardware", National Instruments, Apr. 20, 2016, pp. 1-8.
"National Instruments Wireless Research Handbook", National Instruments, May 2016, pp. 1-37.
Shepard et al. "Argos: Practical Many-Antenna Base Stations" *MobiCom 12*, Aug. 22-26, 2012, Istanbul, Turkey, pp. 53-64.
Khoolenjani, et al. "Distribution of the Ratio of Normal and Rice Random Variables" Digital Commons @WayneState, *Journal of Modern Applied Statistical Methods*, vol. 12, Issue 2, Article 27, Nov. 1, 2013, pp. 1-15.
Shen et al. "Channel Estimation in OFDM Systems", Freescale Semiconductor, Inc. Application Note, Jan. 2006, pp. 1-16.
Rusek, F. et al. "Scaling up MIMO: Opportunities and Challenges with Very Large Arrays." *Signal Processing Magazine*. IEEE. pp. 40-60, 2013.
Vieira et al. "Reciprocity Calibration for Massive MIMO: Proposal, Modeling and Validation." IEEE Transactions on Wireless Communications. Published Mar. 17, 2017 pp. 1-15.

* cited by examiner

| FOR EACH ANTENNA PAIR OF THE SETS OF ANTENNA PAIRS: SEND CALIBRATION PILOTS FORTH AND BACK BETWEEN THE ANTENNA PAIR ON A PLURALITY OF SUBCARRIERS TO ESTIMATE EFFECTIVE FORWARD AND BACKWARD CHANNEL RESPONSES BETWEEN THE ANTENNA PAIR FOR EACH OF THE PLURALITY OF SUBCARRIERS, AND CALCULATE RECIPROCITY COEFFICIENT FOR THE ANTENNA PAIR FOR EACH OF THE PLURALITY OF SUBCARRIERS USING THE ESTIMATED CHANNEL RESPONSES FOR EACH OF THE PLURALITY OF SUBCARRIERS 1002 |

↓

| AVERAGE THE CALCULATED RECIPROCITY COEFFICIENTS OVER THE PLURALITY OF SUBCARRIERS TO OBTAIN A MEAN RECIPROCITY COEFFICIENT ESTIMATE FOR THE ANTENNA PAIR, WHICH IS THE CALCULATED RECIPROCITY COEFFICIENT FOR THE ANTENNA PAIR 1004 |

| CALCULATE THE RECIPROCITY COEFFICIENT ESTIMATE USING THE OBTAINED MEAN RECIPROCITY COEFFICIENT ESTIMATE FOR THE SET OF ANTENNA PAIRS ASSOCIATED WITH THE PATH 1102 |

ESTIMATE AN EFFECTIVE FORWARD AND BACKWARD CHANNEL RESPONSE FOR A PLURALITY OF THE MULTIPLE SUBCARRIERS BY SENDING CALIBRATION PILOTS FORTH AND BACK BETWEEN THE ANTENNA $m$ AND THE ANTENNA $r$ ON EACH OF THE PLURALITY OF SUBCARRIERS 1302

CALCULATE A RECIPROCITY COEFFICIENT FOR THE ANTENNA PAIR $(m, r)$ FOR EACH OF THE PLURALITY OF SUBCARRIERS USING THE EFFECTIVE FORWARD AND BACKWARD CHANNEL RESPONSES ESTIMATED FOR EACH OF THE PLURALITY OF SUBCARRIERS 1304

AVERAGING THE CALCULATED RECIPROCITY COEFFICIENTS OF THE ANTENNA PAIR $(m, r)$ OVER THE PLURALITY OF SUBCARRIERS TO OBTAIN THE SINGLE-HOP RECIPROCITY COEFFICIENT ESTIMATE FOR THE ANTENNA PAIR $(m, r)$
1306

FOR EACH OF THE SINGLE-HOP RECIPROCITY CALIBRATION COEFFICIENT ESTIMATE FOR THE ANTENNA PAIR $(R_R, R_L)$ AND THE ONE OR MORE DUAL-HOP RECIPROCITY CALIBRATION COEFFICIENT ESTIMATES FOR THE ANTENNA PAIR $(R_R, R_L)$, CALCULATE A RESPECTIVE WEIGHT 1402

CALCULATE A SUM OF PRODUCTS OF THE SINGLE-HOP RECIPROCITY CALIBRATION COEFFICIENT ESTIMATE FOR THE ANTENNA PAIR (RR, RL) AND THE ONE OR MORE DUAL-HOP RECIPROCITY CALIBRATION COEFFICIENT ESTIMATES FOR THE ANTENNA PAIR (RR, RL) AND THEIR RESPECTIVE WEIGHTS TO PRODUCE THE COMBINED RECIPROCITY CALIBRATION COEFFICIENT ESTIMATE FOR THE ANTENNA PAIR (RR, RL) 1404

US 10,312,978 B2

WIRELESS TRANSCEIVER STATION WITH PERFORMS MULTI-PATH RECIPROCITY CALIBRATION WITH MULTIPLE REFERENCE ANTENNAS

CROSS REFERENCE TO RELATED APPLICATION(S)

This application claims priority based on U.S. Provisional Application Ser. No. 62/534,130, filed Jul. 18, 2017, entitled MULTI-PATH MULTI-STAGE RECIPROCITY CALIBRATION WITH MULTIPLE REFERENCE ANTENNAS, which is hereby incorporated by reference in its entirety.

BACKGROUND

The New Radio (NR) definition in 3GPP ($3^{rd}$ Generation Partnership Project) for mobile communication systems will encompass a variety of deployment scenarios envisioned for 5G (fifth generation) mobile communication systems. MIMO (multiple input, multiple output) communication systems can be used for 5G TDD (time division duplex) air interfaces. In particular, massive MIMO reciprocity-based TDD air interfaces allow for symbol-level switching and potential configurability that in turn allow for features to support various aspects of 5G air interfaces, for example, enhanced Mobile BroadBand (eMBB), massive Machine Type Communications (mMTC) and Ultra-Reliable and Low Latency Communications (URLLC). Example embodiments for massive MIMO communication systems and related reciprocity-based TDD air interfaces are described within U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety.

Many-element antenna arrays, in the order of hundreds of elements per array, are a core component of 5G communications systems. The massive MIMO systems utilize time division duplex (TDD) to separate uplink and downlink. A key implementation requirement is to use knowledge about the wireless channel, obtained in the uplink, to precode signals for the downlink transmission. This technique is referred to as "reciprocity-based precoding." Precoding ensures that multiple mobile stations, with only a few antennas each, receive downlink signals without multi-user interference.

Typically, different radio components are used for uplink and downlink transmission at the base station. Their impact needs to be calibrated accurately (reciprocity calibration) such that uplink channel information can be used for downlink precoding. Inaccurate calibration results in multi-user interference in the downlink, which results in reduced data rates.

Calibration can be implemented internally within the base station array by measuring the channel between individual base station array antenna elements. These measurements need to be accurate. Antenna array calibration accuracy can be severely reduced if the link between a certain antenna element and a reference antenna element is attenuated, for instance, due to array geometry.

BRIEF SUMMARY

In one aspect the present invention provides a wireless transceiver station that includes M antennas connected to radio transceivers and a processor programmed to designate an antenna of the M antennas as a target reference antenna. For each antenna m of the M antennas other than the target reference antenna, the processor is further programmed to: define N distinct paths from the antenna m to the target reference antenna through zero or more intermediate reference antennas of the M antennas, wherein N for the antenna m is two or more; wherein each of the N distinct paths has a distinct associated set of one or more antenna pairs of the M antennas; for each antenna pair of the sets of antenna pairs, estimate an effective forward and backward channel response by sending calibration pilots forth and back between the antenna pair and calculate a reciprocity coefficient for the antenna pair using the estimated channel responses; for each path of the N distinct paths, calculate a reciprocity coefficient estimate using the reciprocity coefficients calculated for the set of antenna pairs associated with the path; and combine the N calculated reciprocity coefficient estimates to produce a final reciprocity coefficient estimate for antenna pair (m, target reference antenna).

In another aspect, the present invention provides a wireless transceiver station having M antennas connected to radio transceivers and a processor programmed to designate an antenna of the M antennas as a target reference antenna and to designate a subset of R antennas of the M antennas as reference antennas, where the target reference antenna is included in the subset, where R is at least two. For each antenna m of the M antennas other than the target reference antenna, the processor is programmed to define N distinct paths from the antenna m to the target reference antenna through zero or more of P distinct pairs of antennas (rr, rl) of the subset of R reference antennas, where P is at least one, where N for the antenna m is two or more. For at least each antenna pair (m, r) included in the N distinct paths for the M antennas, the processor is programmed to estimate an effective forward and backward channel response by sending calibration pilots forth and back between the antenna pair (m, r) and to calculate a single-hop reciprocity coefficient estimate for the antenna pair (m, r) using the estimated effective forward and backward channel responses for the antenna pair (m, r). For each antenna pair (rr, rl) of the P distinct pairs of antennas (rr, rl) of the subset of R reference antennas, the processor is programmed to calculate one or more dual-hop reciprocity coefficient estimates for the antenna pair (rr, rl) through respective one or more antennas of the M antennas, where each respective antenna is distinct from rr and rl and to combine the single-hop reciprocity calibration coefficient estimate for the antenna pair (rr, rl) and the one or more dual-hop reciprocity calibration coefficient estimates for the antenna pair (rr, rl) to generate a combined reciprocity calibration coefficient estimate for the antenna pair (rr, rl). For each antenna m of the M antennas, for each path of the N distinct paths for the antenna m, the processor is programmed to calculate a respective reciprocity coefficient estimate using the combined reciprocity calibration coefficient estimates for each of the antenna pairs (rr, rl) included in the path and the single-hop reciprocity coefficient estimate for the antenna pair (m, r), where antenna r is one of the antennas in antenna pair (rr, rl) included in the path. For each antenna m of the M antennas, the processor is programmed to combine the N respective reciprocity coefficient estimates to produce a final reciprocity coefficient estimate for antenna pair (m, target reference antenna).

In yet another aspect, the present invention provides a method that includes designating an antenna of M antennas of a wireless transceiver station as a target reference antenna and for each antenna m of the M antennas other than the target reference antenna: defining N distinct paths from the antenna m to the target reference antenna through zero or more intermediate reference antennas of the M antennas, wherein N for the antenna m is two or more, wherein each of the N distinct paths has a distinct associated set of one or more antenna pairs of the M antennas; for each antenna pair of the sets of antenna pairs, estimating an effective forward and backward channel response by sending calibration pilots forth and back between the antenna pair and calculating a reciprocity coefficient for the antenna pair using the estimated channel responses; for each path of the N distinct paths, calculating a reciprocity coefficient estimate using the reciprocity coefficients calculated for the set of antenna pairs associated with the path; and combining the N calculated reciprocity coefficient estimates to produce a final reciprocity coefficient estimate for antenna pair (m, target reference antenna).

In yet another aspect, the present invention provides a method that includes designating one antenna of the M antennas as a target reference antenna; designating a subset of R antennas of the M antennas as reference antennas, where the target reference antenna is included in the subset, where R is at least two; for each antenna m of the M antennas other than the target reference antenna, defining N distinct paths from the antenna m to the target reference antenna through zero or more of P distinct pairs of antennas (rr, rl) of the subset of R reference antennas, where P is at least one, where N for the antenna m is two or more; for at least each antenna pair (m, r) included in the N distinct paths for the M antennas, estimating an effective forward and backward channel response by sending calibration pilots forth and back between the antenna pair (m, r) and calculating a single-hop reciprocity coefficient estimate for the antenna pair (m, r) using the estimated effective forward and backward channel responses for the antenna pair (m, r); for each antenna pair (rr, rl) of the P distinct pairs of antennas (rr, rl) of the subset of R reference antennas, calculating one or more dual-hop reciprocity coefficient estimates for the antenna pair (rr, rl) through respective one or more antennas of the M antennas, where each respective antenna is distinct from rr and rl and combining the single-hop reciprocity calibration coefficient estimate for the antenna pair (rr, rl) and the one or more dual-hop reciprocity calibration coefficient estimates for the antenna pair (rr, rl) to generate a combined reciprocity calibration coefficient estimate for the antenna pair (rr, rl); for each antenna m of the M antennas, for each path of the N distinct paths for the antenna m, calculating a respective reciprocity coefficient estimate using the combined reciprocity calibration coefficient estimates for each of the antenna pairs (rr, rl) included in the path and the single-hop reciprocity coefficient estimate for the antenna pair (m, r), where antenna r is one of the antennas in antenna pair (rr, rl) included in the path; and for each antenna m of the M antennas, combining the N respective reciprocity coefficient estimates to produce a final reciprocity coefficient estimate for antenna pair (m, target reference antenna).

BRIEF DESCRIPTION OF THE DRAWINGS

FIGS. 6 through 14 are flowcharts illustrating operation of the wireless transceiver station of FIG. 5.

DETAILED DESCRIPTION OF THE EMBODIMENTS

Need for Reciprocity Calibration

Figure 1:
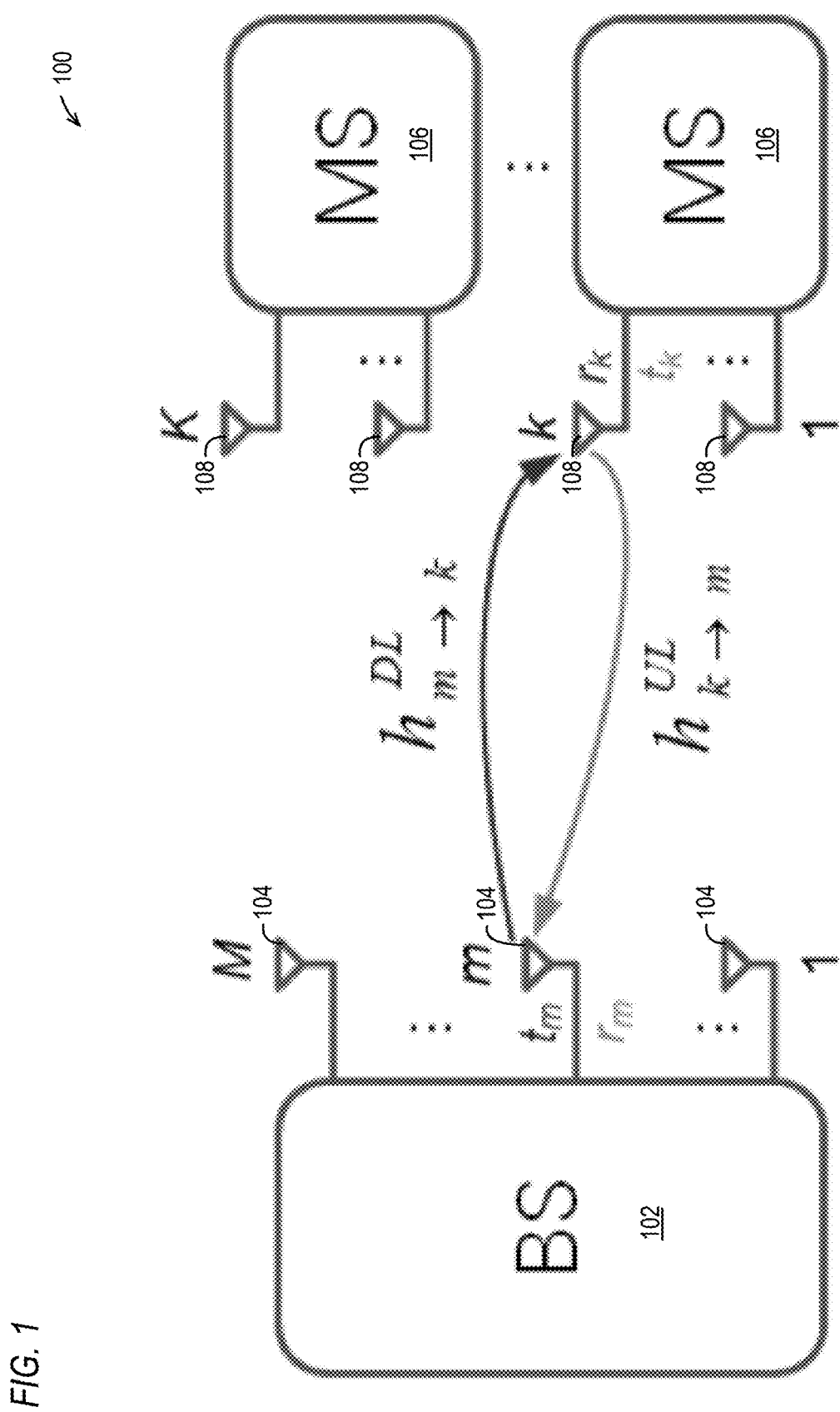
FIG. 1 is a block diagram illustrating an example embodiment for channel reciprocity associated with a wireless transceiver station with M antennas that provides a wireless MIMO communication system.

Referring now to FIG. 1, a block diagram illustrating an example embodiment for channel reciprocity associated with a wireless transceiver station 102 (e.g., a cellular base station, wireless router, or other wireless transceiver station), also referred to herein as a base station 102, with M antennas 104 that provides a wireless MIMO communication system 100 is shown. An individual BS 102 antenna is referred to generically as antenna m. The MIMO base station 102 communicates through its M antennas 104 with multiple mobile stations (MS), or user equipment (UE) devices 106, such as mobile handsets, that each have one or more antenna 108, shown in total as K antennas in FIG. 1. An individual MS 106 antenna 108 is referred to generically as antenna k. The need for reciprocity calibration will now be described.

As described above, an example embodiment of a wireless MIMO communication system may use linear reciprocity-based pre-coding in the downlink to suppress downlink inter-user interference in Multi-User MIMO (MU-MIMO) operation mode. This approach assumes that the wireless MIMO channel between the base station (BS) and the mobile stations (MS) is reciprocal, which is valid under certain conditions.

Reduced to a single arbitrary BS-MS antenna pair {m, k}, ideal reciprocity means that the wireless channel response $h_{k \to m}^{UL}$ seen in the uplink is equal to channel response $h_{m \to k}^{DL}$ of the reverse wireless channel seen in the downlink, as shown in Equation (1.1).

$$h_{m \to k}^{DL} = h_{k \to m}^{UL} \quad (1.1)$$

In this case, it is sufficient to estimate the uplink channel responses $h_{k \to m}^{UL}$ between all mobile station antennas k and all base station antennas m for characterizing the wireless MIMO channel in uplink and in downlink.

Due to non-ideal RF transceiver chain components, in practical wireless systems ideal reciprocity cannot be reached even if it is valid for the wireless channel. In practice, the baseband receivers in the base station and the mobile stations see the effective channel responses as given in equations (1.2) and (1.3).

$$\tilde{h}_{k \to m}^{UL} = t_k \cdot h_{k \to m}^{UL} \cdot r_m \quad (1.2)$$

$$\tilde{h}_{m \to k}^{DL} = t_m \cdot h_{m \to k}^{DL} \cdot r_k \qquad (1.3)$$

These equations include the transmit responses $t_k$, $t_m$ and the receive responses $r_m$, $r_k$ of the respective analog transceiver front ends connected to the BS antenna m and MS antenna k. Due to analog component variations and dynamic effects from clocking structures, such as clock dividers, multipliers, and phase-locked loops (PLLs), it is practically impossible to realize analog front ends with identical reciprocal transmit and receive responses. Typically, random phase and magnitude differences are observed between the analog front-end responses, which might change with every reset of the respective radio hardware. This is why the reciprocity condition does not hold for the effective channel responses, as indicated in equation (1.4).

$$\tilde{h}_{m \to k}^{DL} \ne \tilde{h}_{k \to m}^{UL} \qquad (1.4)$$

However, after a reciprocity calibration (sufficient to run at the base station side only), it is still possible to derive an estimate for the effective downlink channel response $\tilde{h}_{m \to k}^{DL}$ from the estimated effective uplink channel response $\tilde{h}_{m \to k}^{UL}$ if the physical wireless channel is reciprocal.

Reciprocity Calibration Fundamentals

As given in equations (1.2) and (1.3), the effective channel response $\tilde{h}$ between any two transceivers can be expressed as the product of the transmitter (TX) front end response t, the physical wireless channel responses h, and the receiver (RX) front end response r.

A reciprocity calibration factor $b_{m \to k}$ can be defined as the quotient between the channel responses of the effective forward channel and the effective backward channel given in equation (1.5).

$$b_{m \to k} = \frac{\tilde{h}_{m \to k}^{DL}}{\tilde{h}_{k \to m}^{UL}} = \frac{t_m \cdot h_{m \to k}^{DL} \cdot r_k}{t_k \cdot h_{k \to m}^{UL} \cdot r_m} \qquad (1.5)$$

As long as the reciprocity condition of equation (1.1) is valid for the wireless propagation channel between base station antenna m and mobile station antenna k, the reciprocity calibration coefficient $b_{m \to k}$ reduces to equation (1.6)

$$b_{m \to k} = \frac{t_m \cdot h_{m \to k}^{DL} \cdot r_k}{t_k \cdot h_{k \to m}^{UL} \cdot r_k} = \frac{t_m \cdot r_k}{t_k \cdot r_m} = \frac{t_m}{r_m} \cdot \frac{r_k}{t_k} = b_{k \to m}^{-1} \qquad (1.6)$$

and the corresponding effective downlink channel response can be calculated from the effective uplink channel response as in equation (1.7).

$$\tilde{h}_{m \to k}^{DL} = \tilde{h}_{k \to m}^{UL} \cdot b_{m \to k} = \tilde{h}_{k \to m}^{UL} \cdot \frac{t_m \cdot r_k}{r_m \cdot t_k} \qquad (1.7)$$

In this case, the reciprocity calibration factor only depends on the transmit and receive responses of the involved analog front ends. Of course, this also works in the reverse direction. Generally, we can write the relation shown in (1.8).

$$\tilde{h}_{m \to k} = \tilde{h}_{k \to m} \cdot b_{m \to k} = \frac{\tilde{h}_{k \to m}}{b_{k \to m}} \Leftrightarrow \tilde{h}_{k \to m} = \tilde{h}_{k \to m} \cdot b_{k \to m} = \frac{\tilde{h}_{m \to k}}{b_{m \to k}} \qquad (1.8)$$

Equations (1.7) and (1.8) are still not practical for a direct implementation in real systems since they would require measuring the reciprocity coefficients between every BS and MS antenna pair. For this, pilots would have been required also in the downlink to be sent from every BS antenna to every MS antenna as well as measurement feedback in the reverse directions. Moreover, since the mobile stations are typically not clock coupled to the base station, reciprocity measurements would have been needed frequently to compensate for related phase drifts.

BS Internal Relative Reciprocity Calibration with 1 Reference Antenna

For this reason, a BS internal relative reciprocity calibration scheme that relies on reciprocity measurements at the BS only has been proposed. For this, it estimates the reciprocity coefficients $b_{m \to r}$ between the front end of one fixed BS reference antenna r and the front ends of all other BS antennas m≠r per equation (1.9).

$$b_{m \to r} = \frac{t_m \cdot h_{m \to r} \cdot r_r}{t_r \cdot h_{r \to m} \cdot r_m} \qquad (1.9)$$

For this purpose, known pilots are transmitted over the air back and forth between the BS antenna pairs (m, r) during the calibration procedure. As long as the reciprocity condition $h_{m \to r} = h_{r \to m}$ is valid for the wireless channel between the different BS antennas, the corresponding reciprocity factors only depend on the transmit and receive responses of the involved analog BS front ends as shown in equation (1.10).

$$b_{m \to r} = \frac{t_m \cdot r_r}{t_r \cdot r_m} \qquad (1.10)$$

Note that the reciprocity factors $b_{m \to r}$ measured at the base station are assumed to be approximately stable over a longer time period since all base station front ends are clock coupled. Practically, the length of this period depends also on different front end properties and potential impairments, e.g., phase noise characteristics, phase drifts caused by thermal effects, etc.

With the BS reciprocity factors $b_{m \to r}$ defined above, the reciprocity factor between base station antenna m and mobile station antenna k can be calculated per equation (1.11).

$$b_{m \to k} = \frac{t_m \cdot r_k}{r_m \cdot t_k} = \frac{t_m \cdot t_r \cdot r_r \cdot r_k}{r_m \cdot t_r \cdot r_r \cdot t_k} = \frac{t_m \cdot r_r}{r_m \cdot t_r} \cdot \frac{t_r \cdot r_k}{r_r \cdot t_k} = b_{m \to r} \cdot b_{r \to k} \qquad (1.11)$$

Finally, the effective downlink channel response between an arbitrary BS antenna transceiver m and the MS antenna transceiver k can be derived from the effective uplink channel response per equation (1.12).

$$\tilde{h}_{m \to k}^{DL} = \tilde{h}_{k \to m}^{UL} \cdot b_{m \to r} \cdot b_{r \to k} \qquad (1.12)$$

Thus, with the BS reciprocity calibration factors $b_{m \to r}$ and estimates for $\tilde{h}_{k \to m}^{UL}$, all downlink channel responses $\tilde{h}_{m \to k}^{DL}$ can be calculated up to a common factor $b_{r \to k}$. A common factor applied to all BS antennas does not change the beamforming characteristics, i.e., for all multi-user beamforming techniques using linear precoding it is sufficient to work with relative effective channel estimates as indicated in equation (1.13).

$$\tilde{h}'^{DL}_{m \to k} = \tilde{h}^{UL}_{k \to m} \cdot b_{m \to r} \quad (1.13)$$

Note that the reciprocity coefficient for m=r practically cannot be measured. Mathematically it reduces to $b_{m \to m}=1$.

Improved BS Internal Reciprocity Calibration Combining Single and Multi-Hop Calibration Estimates We have observed that the described reciprocity calibration method with one BS reference antenna works well as long as the reference antenna has a good wireless channel to all other base station antenna elements. Unfortunately, this cannot be always assured, especially if the base station works with a large number of antenna elements. In these cases, the method described above is extremely sensitive to the actual antenna arrangement. If one or more BS antenna elements m see a bad channel to the BS reference antenna r, the estimates of the related reciprocity coefficients $b_{m \to r}$ may become unreliable. This can drastically reduce the multi-user downlink performance since also the derived estimates for $\tilde{h}'^{DL}_{m \to k}$ may be unreliable, which may affect calculation of the downlink pre-coding weights.

This problem can be solved by using not only direct reciprocity measurements between the BS antenna (transceiver) m and BS reference antenna (transceiver) r, but also indirect reciprocity estimates derived from reciprocity measurement results from/to other BS antenna elements. For this, we define a set of multiple BS reference antennas $\mathcal{R} = \{r_1 \ldots r_R\}$ with R≤M. $r_1$ substitutes the former BS reference antenna r, i.e., acts as the BS reference antenna to the MS antenna k. Antennas $r_2 \ldots r_R$ are additional reference antennas used for the BS internal reciprocity calibration. According to equation (1.13), for estimating the relative downlink channel responses $\tilde{h}'^{DL}_{m \to k}$ we need to estimate the reciprocity factors between BS antennas m and reference antenna $r_1$ per equation (1.14).

$$b_{m \to r} = b_{m \to r_1} = \frac{t_m \cdot r_{r_1}}{r_m \cdot t_{r_1}} \quad (1.14)$$

Expanding the fraction in (1.14) shows that $b_{m \to r_1}$ can also be calculated by equation (1.15).

$$b_{m \to r_1} = \frac{t_m \cdot r_{r_r}}{r_m \cdot t_{r_r}} \cdot \frac{t_{r_r} \cdot r_{r_1}}{r_{r_r} \cdot t_{r_1}} = b_{m \to r_r} \cdot b_{r_r \to r_1} := b_{m \to r_1 | r_r} \quad (1.15)$$

This result indicates that $b_{m \to r_1}$ cannot only be determined by direct ("single-hop") reciprocity measurements, but also by indirect ("dual-hop") reciprocity estimates using an additional BS reference antenna $r_r$ as intermediate reference point. Equation (1.15) can be further extended from using one intermediate reference antenna (dual-hop estimates) to using multiple intermediate reference antennas (multi-hop estimates). In a compact form this can be expressed as equation (1.16).

$$b_{m \to r_1} \prod_{\forall (a,b) \in \mathcal{A}_n} b_{a \to b} := b_{m \to r_1 | \mathcal{A}_n} \quad (1.16)$$

Here $\mathcal{A}_n$ represents a specific set of antenna index pairs (a, b) which corresponds to the indices of all BS antenna pairs involved in one specific multi-hop calibration estimate from BS antenna m to target BS reference antenna $r_1$. For example, consider a triple-hop calibration estimate from antenna m over intermediate reference antennas $r_3$ and $r_2$ to target antenna $r_1$. This leads to equations (1.17) and (1.18).

$$\mathcal{A}_1 = \{(m, r_3), (r_3, r_2), (r_2, r_1)\} \quad (1.17)$$

$$b_{m \to r_1 | \mathcal{A}_1} = \prod_{\forall (a,b) \in \mathcal{A}_1} b_{a \to b} = b_{m \to r_3} \cdot b_{r_3 \to r_2} \cdot b_{r_2 \to r_1} \quad (1.18)$$

Note that equation (1.16) generally holds for every set $\mathcal{A}_n$ of BS antenna pair indices which describes a valid single-hop or multi-hop "connection," or "path," from a BS antenna m to the target reference antenna $r_1$. It does not depend on the definition of additional reference antennas.

The use of single-hop and multi-hop calibration estimates leads to multiple options for estimating a specific reciprocity calibration factor $b_{m \to r_1}$. With N different estimation options, N individual estimates $\hat{b}_{m \to r_1 | \mathcal{A}_n}$ for $b_{m \to r_1}$ can be obtained. Combining these estimates in a proper way may lead to a robust and reliable estimate for $b_{m \to r_1}$. The following 3 combining method embodiments have been considered: (1) Equal gain combining (linear average) described in equation (1.19); (2) Selection combining described in equation (1.20); and (3) Weighted combining described in equations (1.21) and (1.22).

$$\hat{b}_{m \to r_1} = \frac{1}{N} \sum_{n=1}^{N} \hat{b}_{m \to r_1 | \mathcal{A}_n} \text{ for } m \neq r_1 \quad (1.19)$$

$$\hat{b}_{m \to r_1} = \arg\min_{\hat{b}_{m \to r_1 | \mathcal{A}_n}} \text{Var}\{\hat{b}_{m \to r_1 | \mathcal{A}_n}\} \text{ for } m \neq r_1 \quad (1.20)$$

$$\hat{b}_{m \to r_1} = \sum_{n=1}^{N} w_n \cdot \hat{b}_{m \to r_1 | \mathcal{A}_n} \text{ for } m \neq r_1 \quad (1.21)$$

with $$w_n = \frac{\frac{1}{\text{Var}\{\hat{b}_{m \to r_1 | \mathcal{A}_n}\}}}{\sum_{n'=1}^{N} \frac{1}{\text{Var}\{\hat{b}_{m \to r_1 | \mathcal{A}_{n'}}\}}} \quad (1.22)$$

Since the last 2 methods take the variances $\text{Var}\{\hat{b}_{m \to r_1 | \mathcal{A}_n}\}$ of the individual estimates $\hat{b}_{m \to r_1 | \mathcal{A}_n}$ into account, they may provide an improved estimation performance, especially if the variances of the individual estimates differ significantly. For enabling these approaches, the variances $\text{Var}\{\hat{b}_{m \to r_1 | \mathcal{A}_n}\}$ have to be estimated. A detailed calibration procedure including an approach for the variance estimation is described below.

Detailed Reciprocity Calibration Procedure

The detailed calibration procedure relies on the following base assumptions:

The physical wireless propagation channels between all BS antennas are reciprocal (during the measurement time).

The (noise-free) reciprocity coefficients (amplitude and phase differences of the related front-end responses) between all BS antennas are approximately stable over a sufficiently long time period since all base station front ends are clock coupled.

Within the used channel bandwidth, the frequency dependency of the reciprocity coefficients can be neglected.

Thus, the (noise-free) reciprocity coefficients $b_{a \to b}$ between the different BS antennas are assumed to be constant complex factors. This implies that the reciprocity coefficients can be simply estimated in frequency-domain on a sub-carrier basis, which is the simplest way for the given OFDM based system. Sub-carrier wise estimation provides multiple estimates (one per sub-carrier i) for every reciprocity coefficient $b_{a \to b}$.

The detailed estimation procedure can be described as follows.

1. Send calibration pilots $X_p(i)$ on every sub-carrier i forth and back between every BS antenna pair $(a, b) \in \mathcal{A}_n$ according to equations (1.23) and (1.24).

$$Y_{a \to b}(i) = \tilde{H}_{a \to b}(i) \cdot X_p(i) + N_{a \to b}(i) \quad \text{for } a \neq b \quad (1.23)$$

$$Y_{b \to a}(i) = \tilde{H}_{b \to a}(i) \cdot X_p(i) + N_{b \to a}(i) \quad \text{for } a \neq b \quad (1.24)$$

Y(i) stands for the frequency-domain received signals and N(i) for realization of random noise terms caused by TX and RX noise of the involved analog front ends.

2. Estimate the effective forward and backward channels between every BS antenna pair $(a, b) \in \mathcal{A}_n$ according to equations (1.25) and (1.26).

$$\hat{H}_{a \to b}(i) = Y_{a \to b}(i) \cdot X_p^*(i) = \tilde{H}_{a \to b}(i) + N_{a \to b}(i) \cdot X_p^*(i) \quad \text{for } a \neq b \quad (1.25)$$

$$\hat{H}_{b \to a}(i) = Y_{b \to a}(i) \cdot X_p^*(i) = \tilde{H}_{b \to a}(i) + N_{b \to a}(i) \cdot X_p^*(i) \quad \text{for } a \neq b \quad (1.26)$$

Here for simplification it is assumed the pilots have unit magnitude, i.e., $|X_p(i)|=1$.

3. Calculate the reciprocity calibration coefficient for every BS antenna pair (a, b) and sub-carrier i per equation (1.27).

$$\hat{b}_{a \to b}(i) = \frac{\hat{H}_{a \to b}(i)}{\hat{H}_{b \to a}(i)} \approx b_{a \to b} + \tilde{N}_{a \to b}(i) \quad \text{for } a \neq b \quad (1.27)$$

Note: $\hat{b}_{a \to b}(i)$ can be interpreted as realization of an approximately Gaussian random variable $\hat{b}_{a \to b}$.

4. Calculate the estimates $\hat{b}_{m \to r_1 | \mathcal{A}_n}(i)$ for the target reciprocity factor $b_{m \to r_1}$ for every sub-carrier i for the estimation option described by $\mathcal{A}_n$ per equation (1.28).

$$\hat{b}_{m \to r_1 | \mathcal{A}_n}(i) = \prod_{\forall (a,b) \in \mathcal{A}_n} \hat{b}_{a \to b}(i) \quad (1.28)$$

5. Estimate the mean and variance of the reciprocity coefficient estimate $\hat{b}_{m \to r_1 | \mathcal{A}_n}$ obtained for the estimation option described by $\mathcal{A}_n$ per equations (1.29) and (1.30).

$$E\{\hat{b}_{m \to r_1 | \mathcal{A}_n}\} \approx \bar{b}_{m \to r_1 | \mathcal{A}_n} = \frac{1}{N_{sc}} \sum_{i=1}^{N_{sc}} \hat{b}_{m \to r_1 | \mathcal{A}_n}(i) \quad \text{for } m \neq r_1 \quad (1.29)$$

$$\text{Var}\{\hat{b}_{m \to r_1 | \mathcal{A}_n}\} \approx \sigma^2_{\hat{b}_{m \to r_1 | \mathcal{A}_n}} = \frac{1}{N_{sc}-1} \sum_{i=1}^{N_{sc}} |\hat{b}_{m \to r_1 | \mathcal{A}_n}(i) - \bar{b}_{m \to r_1 | \mathcal{A}_n}|^2 \quad \text{for } m \neq r_1 \quad (1.30)$$

$N_{sc}$ is the number of pilot sub-carriers used for estimation. The variance of the mean estimate $\bar{b}_{m \to r_1 | \mathcal{A}_n}$, accounting for the averaging over multiple subcarriers, can be estimated from equation (1.30) per equation (1.31).

$$\text{Var}\{\bar{b}_{m \to r_1 | \mathcal{A}_n}\} \approx \frac{1}{N_{sc}} \text{Var}\{\hat{b}_{m \to r_1 | \mathcal{A}_n}\} \approx \sigma^2_{\bar{b}_{m \to r_1 | \mathcal{A}_n}} = \frac{1}{N_{sc}} \sigma^2_{\hat{b}_{m \to r_1 | \mathcal{A}_n}}. \quad (1.31)$$

6. Repeat steps 1 to 5 for every estimation option n= 1 ... N.

7. Finally, combine the estimates $\bar{b}_{m \to r_1 | \mathcal{A}_n}$ following the weighted combining approach described in equations (1.21) and (1.22), which has been observed as the most powerful approach in tested scenarios, according to equations (1.32) and (1.33).

$$\bar{b}_{m \to r_1} = \sum_{n=1}^{N} w_n \cdot \bar{b}_{m \to r_1 | \mathcal{A}_n} \quad \text{for } m \neq r_1 \quad (1.32)$$

with $$w_n = \frac{1 / \sigma^2_{\bar{b}_{m \to r_1 | \mathcal{A}_n}}}{\sum_{n'=1}^{N} 1 / \sigma^2_{\bar{b}_{m \to r_1 | \mathcal{A}_{n'}}}} \quad \text{for } m \neq r_1 \quad (1.33)$$

Assuming the different estimates $\bar{b}_{m \to r_1 | \mathcal{A}_n}$ are approximately pair-wisely uncorrelated, the variance of $\bar{b}_{m \to r_1}$ can be estimated by equation (1.34).

$$\sigma^2_{\bar{b}_{m \to r_1}} = \sum_{n=1}^{N} w_n^2 \cdot \sigma^2_{\bar{b}_{m \to r_1 | \mathcal{A}_n}} \quad \text{for } m \neq r_1 \quad (1.34)$$

It is noted with respect to equation (1.33), there is no difference if the set of variances of $\bar{b}_{m \to r_1 | \mathcal{A}_n}$ or of $\hat{b}_{m \to r_1 | \mathcal{A}_n}$ are used, since the variances of the different sets differ only by the common scaling factor $$\frac{1}{N_{sc}}.$$

For consistency reasons the variances $$\sigma^2_{\hat{b}_{m \to r_l} | \mathcal{A}_n}$$

have been used.

Multi-Stage Estimation Procedure with Multiple Reference Antennas

Depending on the number of intermediate antennas involved, the overall number of estimation options N can get very large. To keep computational effort at a feasible level, it is helpful to select a suitable set of measurement options based on a priori knowledge about the BS antenna arrangement. For this, it should be considered on the one hand that every additional intermediate reference antenna (i.e., every additional hop) includes the noise effects of additional TX/RX front ends. One the other hand, additional hops are beneficial if the target antennas see a bad wireless channel between each other. Further, additional hops (exponentially) increase the number of estimation options per calibration parameter, which can increase the potential combining gains.

A multi-stage estimation approach is an additional method to keep the computational effort of the reciprocity calibration at a reasonable level. The idea of the multi-stage approach is to hierarchically combine intermediate estimation results in such a way that the number of necessary calculations reduces from stage to stage.

For this specific calibration procedure, a set $\mathcal{R} = \{r_1 \ldots r_r \ldots r_R\}$ of R<M BS antennas is selected as reference antenna set. The selection is done in a way that the physical distance to the target reference antenna $r_1$ increases with the reference antenna index r, i.e., $r_2$ has the shortest distance to $r_1$, $r_3$ the second shortest, and $r_R$ the longest distance. Further, the reference antennas should be approximately equally distributed with the set of all BS antennas. If the BS antennas are grouped into different sub-systems, the reference antennas should be equally distributed to the different sub-systems.

Figure 2:
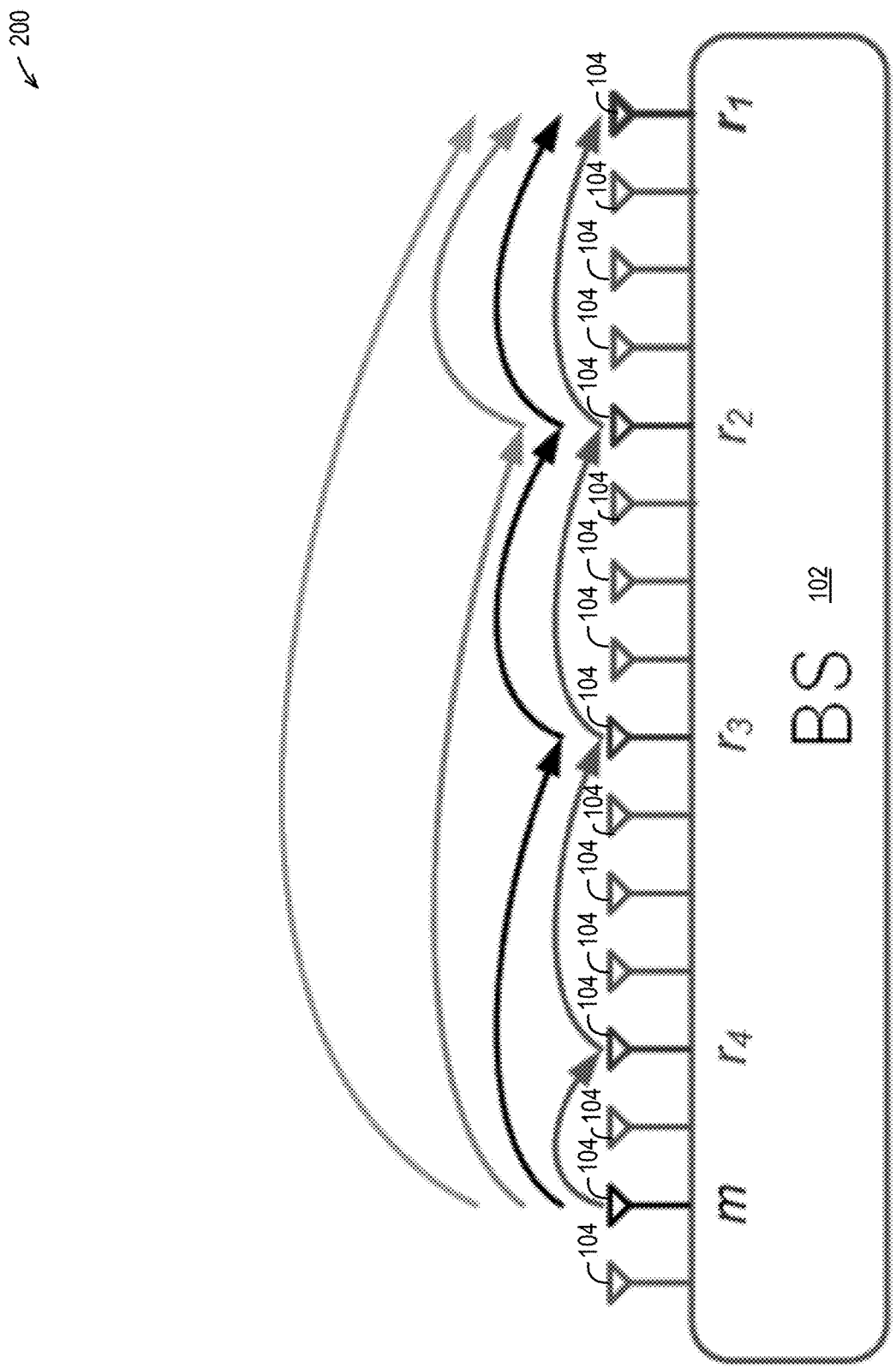
FIG. 2 is a block diagram illustrating multi-path options for estimating reciprocity coefficients at a multi-antenna wireless transceiver station.

Referring now to FIG. 2, a block diagram illustrating multi-path options for estimating reciprocity coefficients at a multi-antenna wireless transceiver station 200 is shown. The wireless transceiver station 200 includes a plurality of antennas 104, referred to generically as m, including reference antennas denoted $r_1$, $r_2$, $r_3$, $r_4$. FIG. 2 also illustrates multiple estimation options for estimating the reciprocity factor for the antenna pair (m, $r_1$), which includes the single-hop option from m to r1 as well as 3 different multi-hop options (1) from m via $r_4$ via $r_3$ via $r_2$ to $r_1$
(2) from m via $r_3$ via $r_2$ to $r_1$
(3) from m via $r_2$ to $r_1$.

Detailed Multi-Stage Calibration Procedure—Variant 1

In one embodiment, the detailed multi-stage calibration procedure variant 1 can be described as follows.

1. Measure the reciprocity coefficients $\hat{b}_{m \to r_r}(i)$ between every BS antenna m and every reference antenna $r_r$ for every sub-carrier i.
   1. M*R (single-hop) measurements according to steps 1 to 3 described in the Detailed Reciprocity Calibration Procedure section above.
   2. All estimates described below will be derived from this measurement data set.
2. Average the measured reciprocity coefficients $\hat{b}_{m \to r_r}(i)$ over all sub-carriers to obtain mean (single-hop) estimates $\bar{b}_{m \to r_r}$ per equations (1.35), (1.36) and (1.37).

$$E\{\hat{b}_{m \to r_r}\} \approx \bar{b}_{m \to r_r} = \frac{1}{N_{sc}} \sum_{i=1}^{N_{sc}} \hat{b}_{m \to r_r}(i) \quad (1.35)$$

$$\text{Var}\{\hat{b}_{m \to r_r}\} \approx \sigma^2_{\hat{b}_{m \to r_r}} = \frac{1}{N_{sc} - 1} \sum_{i=1}^{N_{sc}} |\hat{b}_{m \to r_r}(i) - \bar{b}_{m \to r_r}|^2 \quad (1.36)$$

$$\text{Var}\{\bar{b}_{m \to r_r}\} = \frac{1}{N_{sc}} \text{Var}\{\hat{b}_{m \to r_r}\} \approx \sigma^2_{\bar{b}_{m \to r_r}} = \frac{1}{N_{sc}} \sigma^2_{\hat{b}_{m \to r_r}} \quad (1.37)$$

3. Estimate the mean reciprocity coefficients $\bar{b}_{r_r \to r_l}$ for a selected set of reference antenna pairs ($r_r$, $r_l$).
   The set of reference antenna pairs depends on the multi-hop options considered in calibration step 4. In one embodiment, only the set of immediate neighbor reference antennas is considered, i.e., all ($r_r$, $r_l$) with l=r−1, R≥r>1, with respect to FIG. 2.
   Incorporate direct (single-hop) measurements as well as all dual-hop estimates (over all BS antennas m), e.g., calculate according to equation (1.38). In one embodiment, the averages are computed across the frequency domain before computing the ratio.

$$\hat{b}_{r_r \to r_l | m}(i) = \hat{b}_{r_r \to m}(i) \cdot \hat{b}_{m \to r_l}(i) = \frac{\hat{b}_{m \to r_l}(i)}{\hat{b}_{m \to r_r}(i)} \quad (1.38)$$

Average over the sub-carriers i to approximately determine mean and variance for the estimates $\hat{b}_{r_r \to r_l | m}$ per equations (1.39), (1.40) and (1.41).

$$E\{\hat{b}_{r_r \to r_l | m}\} \approx \bar{b}_{r_r \to r_l | m} = \frac{1}{N_{sc}} \sum_{i=1}^{N_{sc}} \hat{b}_{r_r \to r_l | m}(i) \quad (1.39)$$

$$\text{Var}\{\hat{b}_{r_r \to r_l | m}\} \approx \sigma^2_{\hat{b}_{r_r \to r_l | m}} = \frac{1}{N_{sc} - 1} \sum_{i=1}^{N_{sc}} |\hat{b}_{r_r \to r_l | m}(i) - \bar{b}_{r_r \to r_l | m}|^2 \quad (1.40)$$

$$\text{Var}\{\bar{b}_{r_r \to r_l | m}\} = \frac{1}{N_{sc}} \text{Var}\{\hat{b}_{r_r \to r_l | m}\} \approx \sigma^2_{\bar{b}_{r_r \to r_l | m}} = \frac{1}{N_{sc}} \sigma^2_{\hat{b}_{r_r \to r_l | m}} \quad (1.37)$$

Combine the estimates $\bar{b}_{r_r \to r_l | m}$ following the weighted combining approach described in equations (1.21) and (1.22), per equations (1.42) and (1.43).

$$\bar{b}_{r_r \to r_l} = \sum_{m=1, m \neq r_r}^{M} w_m \cdot \bar{b}_{r_r \to r_l | m} \text{ for } r_r \neq r_l \quad (1.42)$$

with $$w_m = \frac{1 / \sigma^2_{\bar{b}_{r_r \to r_l | m}}}{\sum_{m'=1, m' \neq r_r}^{M} 1 / \sigma^2_{\bar{b}_{r_r \to r_l | m'}}} \text{ for } r_r \neq r_l \quad (1.43)$$

Assuming that the different estimates $\bar{b}_{r_r \to r_l | m}$ are approximately pair-wisely uncorrelated, the variance of $\bar{b}_{r_r \to r_l}$ can be estimated by equation (1.44).

$$\sigma^2_{\bar{b}_{r_r \to r_l}} = \sum_{m=1, m \neq r_r}^{M} w_m^2 \cdot \sigma^2_{\bar{b}_{r_r \to r_l | m}} \quad \text{for } r_r \neq r_l \quad (1.44)$$

It is noted with respect to equation (1.43), there is no difference if the set of variances of $\bar{b}_{r_r \to r_l | m}$ or of $\hat{b}_{r_r \to r_l | m}$ are used, since the variances of the different set differ only by the common scaling factor $$\frac{1}{N_{sc}}.$$

For consistency reasons the variances $$\sigma^2_{\bar{b}_{r_r \to r_l | m}}$$

are used.

4. Derive mean single-hop and multi-hop estimates for the reciprocity factors $b_{m \to r_1}$ between all BS antennas m and the target reference BS antenna $r_1$ based on the mean estimates provided by steps 2 and 3 described above.

The set of evaluated multi-hop estimation options (see FIG. 2) is selected according to the following rules according to one embodiment.

i. Intermediate hops are only allowed from a reference antenna $r_r$ to the reference antenna with the next smaller reference antenna index $r_{r-1}$, i.e., to the nearest reference antenna on the way towards the target reference antenna $r_1$.

ii. Thus, every considered multi-hop option follows the antenna index pattern:

$m \to r_r \to r_{r-1} \to \ldots \to r_1$ with $R \geq r > 1$ iii. Consequently, any dual-hop option starts with the hop to reference antenna $r_2$, any triple-hop option with the hop to antenna $r_3$, etc.

The mean multi-hop estimate $\bar{b}_{m \to r_1 | \mathcal{A}_r}$ for the parameter $b_{m \to r_1}$ calculated for the multi-hop antenna index pattern $m \to r_r \to r_{r-1} \to \ldots \to r_1$ can be expressed as shown in equation (1.45).

$$\bar{b}_{m \to r_1 | \mathcal{A}_r} = \prod_{\forall (a,b) \in \mathcal{A}_r} \bar{b}_{a \to b} = \bar{b}_{m \to r_r} \cdot \prod_{l=2}^{r} \bar{b}_{r_l \to r_{l-1}} \quad (1.45)$$

Here, $\mathcal{A}_r$ is the set of all antenna pair indices describing the specific r-hop option. The mean single-hop estimates $\bar{b}_{m \to r_r}$ are provided by calibration step 2, equation (1.35), and the mean combined estimates $\bar{b}_{r_l \to r_{l-1}}$ are provided by calibration step 3, equation (1.42).

With the assumptions that $|\bar{b}_{a \to b}| \approx |\bar{b}_{m \to r_r}| \approx |\bar{b}_{r_l \to r_{l-1}}| \approx 1$ and that the mutual correlation between these estimates can be neglected, the variance of the different mean multi-hop estimates $\bar{b}_{m \to r_1 | \mathcal{A}_r}$ can be roughly approximated by equation (1.46).

$$\sigma^2_{\bar{b}_{m \to r_1 | \mathcal{A}_r}} \approx \sum_{\forall (a,b) \in \mathcal{A}_r} \sigma^2_{\bar{b}_{a \to b}} = \sigma^2_{\bar{b}_{m \to r_r}} + \sum_{l=2}^{r} \sigma^2_{\bar{b}_{r_l \to r_{l-1}}} \quad (1.46)$$

5. Finally, combine the mean single- and multi-hop estimates derived for the reciprocity factor $b_{m \to r_1}$ to obtain the final high reliability estimate $\bar{\bar{b}}_{m \to r_1}$.

For this, again the weighted combining approach described in equations (1.21) and (1.22) is used, per equations (1.47) and (1.48).

$$\bar{\bar{b}}_{m \to r_1} = \sum_{r=1}^{R} w_r \cdot \bar{b}_{m \to r_1 | \mathcal{A}_r} \quad (1.47)$$

with $$w_r = \frac{1 / \sigma^2_{\bar{b}_{m \to r_1 | \mathcal{A}_r}}}{\sum_{r'=1}^{R} 1 / \sigma^2_{\bar{b}_{m \to r_1 | \mathcal{A}_{r'}}}} \text{ for } m \neq r_1 \quad (1.48)$$

Detailed Multi-Stage Calibration Procedure—Variant 2

In one embodiment, the procedure in this section is almost identical to the procedure in the Detailed Multi-Stage Calibration Procedure—Variant 1 section. Only step 3 has been modified to average over frequency first, followed by the computation of the ratio. Also, the variance computation has been adapted accordingly. This variant provides additional savings with respect to the computational effort. Further the modified estimation step 3 may be more reliable.

1. Measure the reciprocity coefficients $\hat{b}_{m \to r_r}(i)$ between every BS antenna m and every reference antenna $r_r$ for every sub-carrier i.

M*R (single-hop) measurements according to steps 1 to 3 described in the Detailed Reciprocity Calibration section.

All estimates described below will be derived from this measurement data set.

2. Average the measured reciprocity coefficients $\hat{b}_{m \to r_r}(i)$ over all sub-carriers to obtain mean (single-hop) estimates $\bar{b}_{m \to r_r}$ per equations (1.49) and (1.50).

$$E\{\hat{b}_{m \to r_r}\} \approx \bar{b}_{m \to r_r} = \frac{1}{N_{sc}} \sum_{i=1}^{N_{sc}} \hat{b}_{m \to r_r}(i) \quad (1.49)$$

$$\text{Var}\{\hat{b}_{m \to r_r}\} \approx \sigma^2_{\hat{b}_{m \to r_r}} = \frac{1}{N_{sc} - 1} \sum_{i=1}^{N_{sc}} \left| \hat{b}_{m \to r_r}(i) - \bar{b}_{m \to r_r} \right|^2 \quad (1.50)$$

The variance of $\bar{b}_{m \to r_r}$, accounting for the averaging over multiple subcarriers, can be estimated from equation (1.50) as shown in equation (1.51).

$$\text{Var}\{\bar{b}_{m \to r_r}\} = \frac{1}{N_{sc}} \text{Var}\{\hat{b}_{m \to r_r}\} \approx \sigma^2_{\bar{b}_{m \to r_r}} = \frac{1}{N_{sc}} \sigma^2_{\hat{b}_{m \to r_r}}. \quad (1.51)$$

3. Estimate mean reciprocity coefficients $\bar{b}_{r_r \to r_l}$ for a selected set of reference antenna pairs $(r_r, r_l)$.

The set of reference antenna pairs depends on the multi-hop options considered in calibration step 4. In one embodiment, only the set of immediate neighbor reference antennas is considered, i.e., all $(r_r, r_l)$ with $l = r-1$, $R \geq r > 1$, with respect to FIG. 2.

Incorporate direct (single-hop) measurements as well as all dual-hop estimates (over all BS antennas m), e.g., calculate according to equation (1.52).

$$\overline{b}_{r_r \to r_l | m} = \overline{b}_{r_r \to m} \cdot \overline{b}_{m \to r_l} = \frac{\overline{b}_{m \to r_l}}{\overline{b}_{m \to r_r}} \quad (1.52)$$

The variance of the ratio of two independent complex random Gaussian variables a and b with mean and variance $(\mu_a, \sigma_a^2)$, and $(\mu_b, \sigma_b^2)$ can be approximated by equation (1.53).

$$\mathrm{Var}\left\{\frac{a}{b}\right\} \approx \frac{|\mu_a|^2}{|\mu_b|^2}\left(\frac{\sigma_a^2}{|\mu_a|^2} + \frac{\sigma_b^2}{|\mu_b|^2}\right) \quad (1.53)$$

Assuming the right-hand side of equation (1.52) to represent a ratio of independent complex Gaussian random variables, we can approximate the variance of $\overline{b}_{r_r \to r_l | m}$ as follows according to equation (1.54).

$$\mathrm{Var}\{\overline{b}_{r_r \to r_l | m}\} \approx \sigma^2_{\overline{b}_{r_r \to r_l | m}} = \frac{|\overline{b}_{m \to r_l}|^2}{|\overline{b}_{m \to r_r}|^2}\left(\frac{\sigma^2_{\overline{b}_{m \to r_l}}}{|\overline{b}_{m \to r_l}|^2} + \frac{\sigma^2_{\overline{b}_{m \to r_r}}}{|\overline{b}_{m \to r_r}|^2}\right) \quad (1.54)$$

Combine the estimates $\overline{b}_{r_r \to r_l | m}$ following the weighted combining approach described in equations (1.21) and (1.22) per equations (1.55) and (1.56).

$$\overline{b}_{r_r \to r_l} = \sum_{m=1, m \neq r_r}^{M} w_m \cdot \overline{b}_{r_r \to r_l | m} \text{ for } r_r \neq r_l \quad (1.55)$$

with $$w_m = \frac{1/\sigma^2_{\overline{b}_{r_r \to r_l | m}}}{\sum_{m'=1, m' \neq r_r}^{M} 1/\sigma^2_{\overline{b}_{r_r \to r_l | m'}}} \text{ for } r_r \neq r_l \quad (1.56)$$

Assuming the individual estimates $\overline{b}_{r_r \to r_l | m}$ are approximately pair-wisely uncorrelated, the variance of $\overline{b}_{r_r \to r_l}$ can be estimated by equation (1.57).

$$\sigma^2_{\overline{b}_{r_r \to r_l}} = \sum_{m=1, m \neq r_r}^{M} w_m^2 \cdot \sigma^2_{\overline{b}_{r_r \to r_l | m}} \text{ for } r_r \neq r_l \quad (1.57)$$

Figure 15:
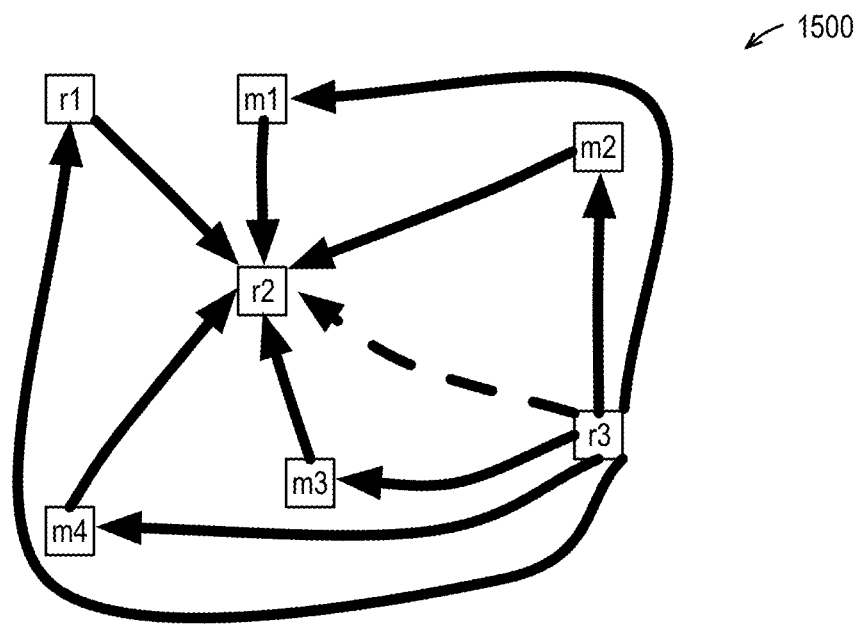
FIG. 15 is a diagram of antennas illustrating operation according to FIG. 12 to provide a highly reliable reciprocity coefficient estimate for a pair of reference antennas.

The combining of single-hop and dual-hop reciprocity coefficient estimates to obtain a highly reliable reciprocity coefficient estimate for a pair of reference antennas $(r_r, r_l)$ (e.g., with respect to equation 1.55) is illustrated in the example of FIG. 15, which is described in more detail below.

4. Derive mean single-hop and multi-hop estimates for the reciprocity factors $b_{m \to r_l}$ between all BS antennas m and the target reference BS antenna $r_1$ based on the mean estimates provided by steps 2 and 3 described above.

The set of evaluated multi-hop estimation options (see FIG. 2, for example) is selected according to the following rules according to one embodiment.
i. Intermediate hops are only allowed from a reference antenna $r_r$ to the reference antenna with the next smaller reference antenna index $r_{r-1}$, i.e., to the nearest reference antenna on the way towards the target reference antenna $r_1$.
ii. Thus, every considered multi-hop option follows the antenna index pattern:

$$m \to r_r \to r_{r-1} \to \ldots \to r_1 \text{ with } R \geq r > 1$$

iii. Consequently, any dual-hop option starts with the hop to reference antenna $r_2$, any triple-hop option with the hop to antenna $r_3$, etc.

The mean multi-hop estimate $\overline{b}_{m \to r_1} | \mathcal{A}_r$ for the parameter $b_{m \to r_1}$ calculated for the multi-hop antenna index pattern $m \to r_r \to r_{r-1} \to \ldots \to r_1$ can be expressed according to equation (1.58).

$$\overline{b}_{m \to r_1 | \mathcal{A}_r} = \prod_{\forall (a,b) \in \mathcal{A}_r} \overline{b}_{a \to b} = \overline{b}_{m \to r_r} \cdot \prod_{l=2}^{r} \overline{b}_{r_l \to r_{l-1}} \quad (1.58)$$

Here $\mathcal{A}_r$ is the set of all antenna pair indices describing the specific r-hop option. The mean single-hop estimates $\overline{b}_{m \to r_r}$ are provided by calibration step 2, equation (1.49), and the mean combined estimates $\overline{b}_{r_l \to r_{l-1}}$ are provided by calibration step 3, equation (1.55).

With the assumptions that $|b_{a \to b}| \approx |\overline{b}_{m \to r_r}| \approx |\overline{b}_{r_l \to r_{l-1}}| \approx 1$ and that any potential mutual correlation between these estimates can be neglected, the variance of the different mean multi-hop estimates $\overline{b}_{m \to r_1} | \mathcal{A}_r$ can be roughly approximated by equation (1.59).

$$\sigma^2_{\overline{b}_{m \to r_1 | \mathcal{A}_r}} \approx \sum_{\forall (a,b) \in \mathcal{A}_r} \sigma^2_{\overline{b}_{a \to b}} = \sigma^2_{\overline{b}_{m \to r_r}} + \sum_{l=2}^{r} \sigma^2_{\overline{b}_{r_l \to r_{l-1}}} \quad (1.59)$$

5. Finally, combine the mean single- and multi-hop estimates derived for the reciprocity factor $b_{m \to r_1}$ to obtain the final high reliability estimate $\overline{\overline{b}}_{m \to r_1}$.
For this, again the weighted combining approach described in equations (1.21) and (1.22) is used, per equations (1.60) and (1.61).

$$\overline{\overline{b}}_{m \to r_1} = \sum_{r=1}^{R} w_r \cdot \overline{b}_{m \to r_1 | \mathcal{A}_r} \quad (1.60)$$

with $$w_r = \frac{1/\sigma^2_{\overline{b}_{m \to r_1 | \mathcal{A}_r}}}{\sum_{r'=1}^{R} 1/\sigma^2_{\overline{b}_{m \to r_1 | \mathcal{A}_{r'}}}} \text{ for } m \neq r_1 \quad (1.61)$$

Method for Fast Runtime Re-Calibration

The calibration coefficients change over time, for instance, as a matter of ambient or device temperature drifts. The calibration method presented in the previous section targets an accurate initial calibration with little prior information about the signal quality between individual antenna elements. The number of estimates obtained during this procedure can be prohibitive for fast re-calibration on run time. This section uses the method presented before to derive a faster means for re-calibration.

Measurement Time

The duration during which the array cannot be used depends on the number of channels which are measured between antenna elements during the calibration procedure. The initial procedure requires the estimation of the channels between all antenna elements in the array and all reference antennas.

As an example, assume a system with 128 antennas is used out of which 10% (12) antennas have been identified as reference antennas. Further, assume pilots are sent from an antenna using all subcarriers. In that case, it takes approximately

- 128 OFDM symbols to measure the channel from all transmitting antenna elements to all receiving reference antennas
- 12 OFDM symbols to measure the channel from 12 transmitting reference antennas to 128 receiving antenna elements
- 140 OFDM symbols=1 radio frame=10 ms to compute the calibration coefficients.

The time during which pilots for calibration are transmitted (calibration measurement time) should be reduced as much as possible to increase the time for the actual data transmission and to minimize interference with the rest of the network.

Reduced Calibration Measurement Time

The following methods allow for an immediate reduction in calibration measurement time.

Frequency Orthogonal Pilots

Calibration coefficients are assumed to be frequency flat. In that case, a single parameter is to be estimated per antenna. This easily permits for using frequency orthogonal pilots and letting multiple antennas transmit at a time.

a. Example: using every $48^{th}$ subcarrier for a pilot transmitted from an antenna leaves 25 pilot subcarriers per antenna. The noise attenuation by averaging 25 subcarriers is still about 14 dB as compared to about 31 dB for 1200 subcarriers.

b. In that case ceil(128/48)=3 OFDM symbols are required to estimate the channels from all antennas to all reference antennas.

c. It still requires 12 OFDM symbols to measure the channel from all reference antennas to all other antennas. (Each reference antenna needs to be received by all other antennas, including reference antennas.) This may lead to a bottleneck.

Reduction of the Number of Reference Antennas

Assume a large set of reference antennas has been used during the initial calibration. The measurement calibration time can be reduced to a fixed duration by determining a reference antenna subset of fixed size by optimization according to the following criteria.

a. The paths between reference antennas should be strong.
b. Each antenna element needs to have at least one strong connection to one reference antenna.

An example is shown in the Figures below.

Figure 3:
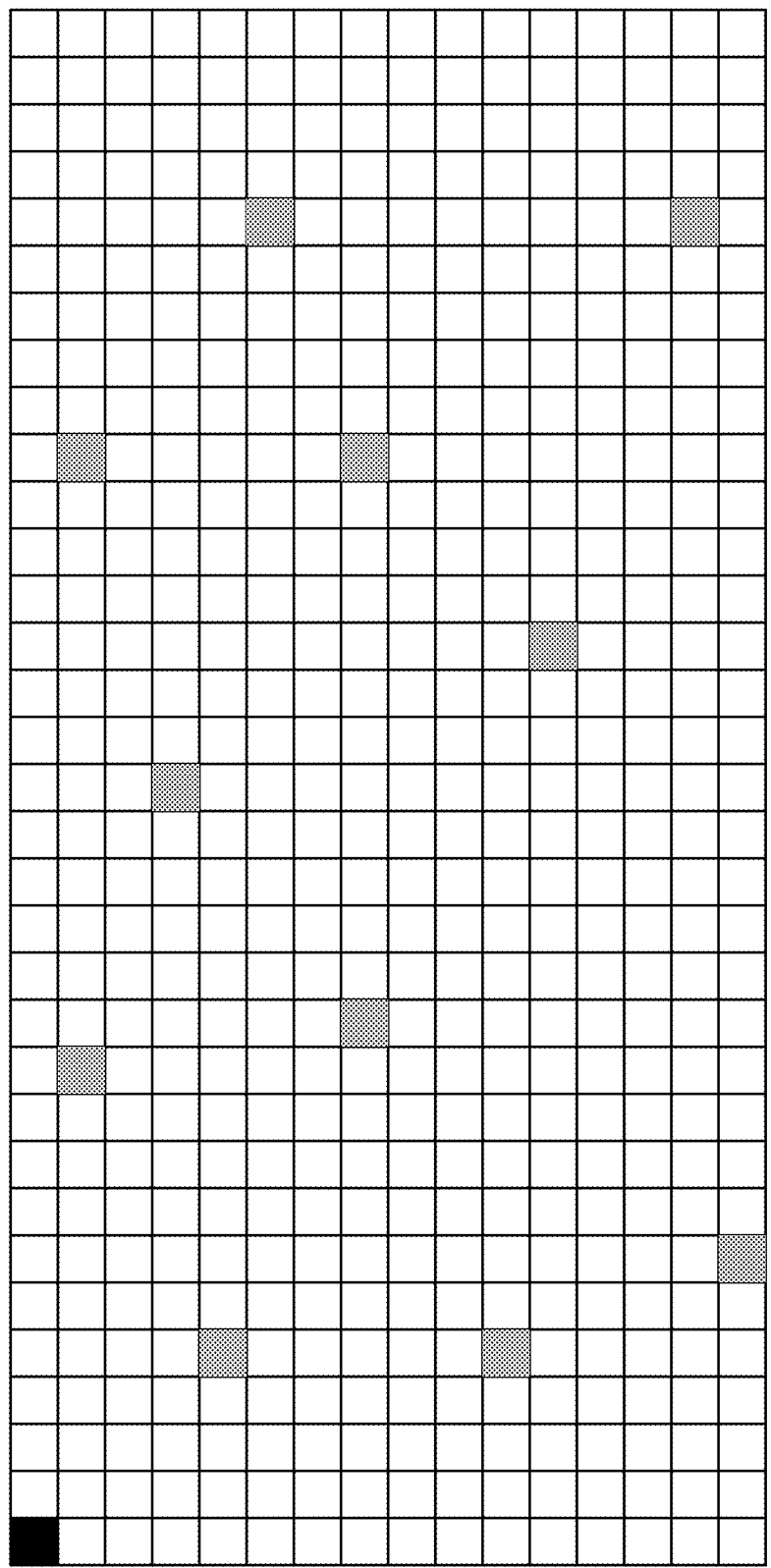
FIG. 3 is a diagram illustrating an initial set of reference antennas used during initial calibration.

Referring now to FIG. 3, a diagram illustrating an initial set of reference antennas used during initial calibration is shown. FIG. 3 shows an array 300 of antenna elements arranged as 16 rows by 33 columns. Twelve of the antennas in the array are included in the initial set of reference antennas (shown in gray: row 2, col. 11; row 2, col. 24; row 4, col. 17; row 5, col. 5; row 6, col. 19; row 8, col. 11; row 8, col. 24; row 11, col. 5; row 12, col. 20; row 15, col. 29; row 16, col. 7), and the reference antennas are relatively evenly distributed throughout the array, as shown. A master reference antenna is shown in black in the top left corner (row 1, column 1).

Figure 4:
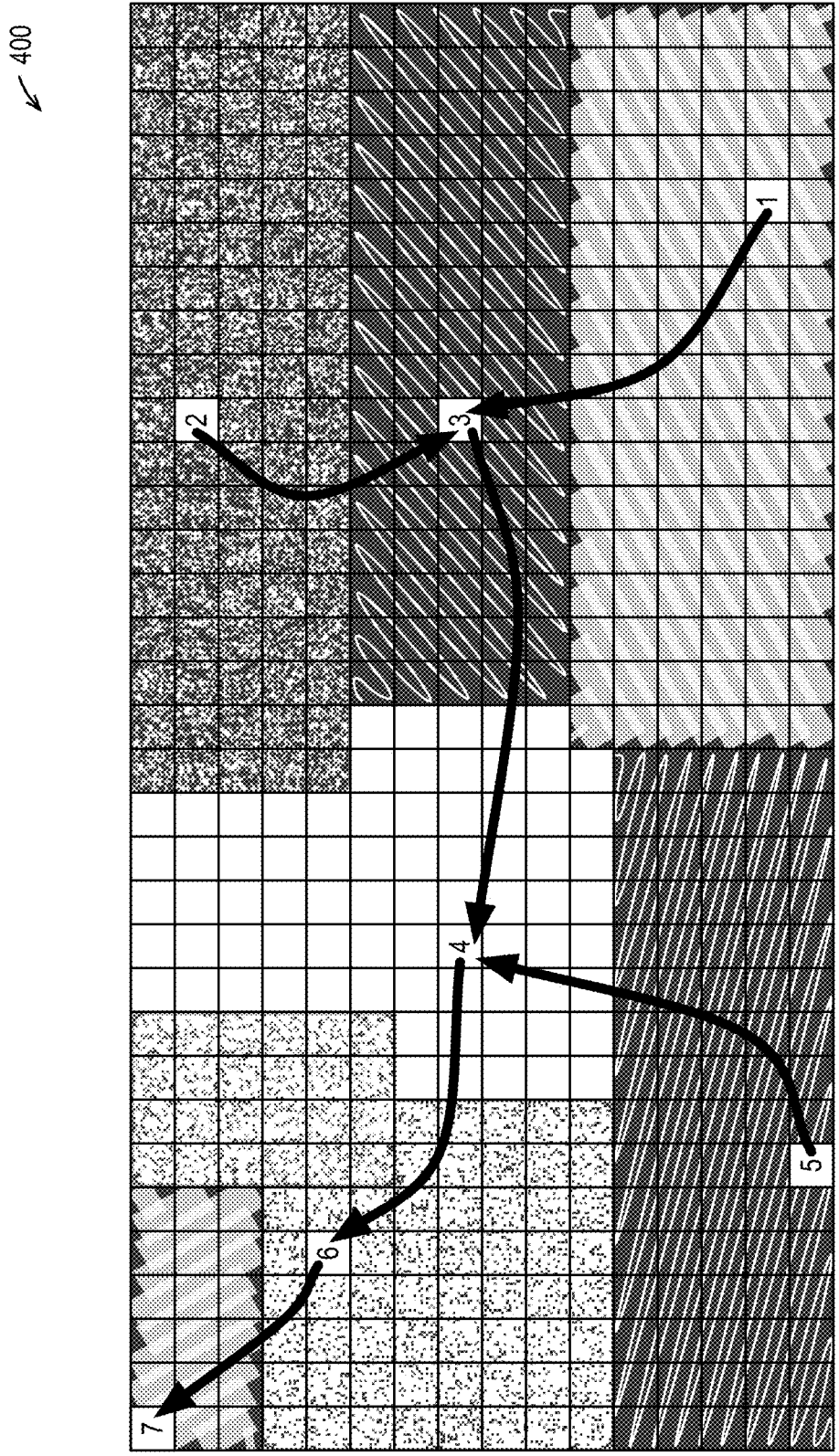
FIG. 4 is a diagram of an antenna array similar to FIG. 3 and illustrating a reduced set of reference antennas relative to the initial set of reference antennas of FIG. 3.

Referring now to FIG. 4, a diagram of an antenna array 400 similar to FIG. 3 and illustrating a reduced set of reference antennas relative to the initial set of reference antennas of FIG. 3 is shown. Out of the large set of initial reference antennas, a smaller subset of reference antennas is derived as shown in FIG. 4. In the example of FIG. 4, seven reference antennas are selected from the initial set. The selected reference antennas are designated 1 through 7, as shown (antenna 1=row 15, col. 29; antenna 2=row 2, col. 24; antenna 3=row 8, col. 24; antenna 4=row 8, col. 11; antenna 5=row 16, col. 7; antenna 6=row 5, col. 5; antenna 7=row 1, col. 1). Also, an association of each antenna element to a reference antenna ensures that each antenna element has a favorable connection to at least one reference antenna. The association is illustrated in FIG. 4 by different types of stipple and cross-hatching. Note that it is only required to measure the channel between the reference antenna and associated antenna elements but not between a reference antenna and non-associated antenna elements. This does not reduce the calibration measurement time but can help reduce the computational time to evaluate the channel measurements. The selection is derived in such a way that:

The aggregate path from each reference antenna to the master reference antenna (top left) satisfies a certain quality criterion.

The path from any antenna element to its reference antenna satisfies a certain quality criterion. In one embodiment, the criterion is aggregate SNR along a multi-hop path.

A further simplification is possible which will be discussed using the example shown above.

OFDM symbol 1: reference antennas 1,2,4,7 transmit; reference antennas 5,6,3 receive.

OFDM symbol 2: reference antennas 3,6,5 transmit and 1,2,4,7 receive.

During these two OFDM symbols, the necessary channels between all reference antennas (for the paths shown) can be estimated. Also, the channel from reference antennas to all other reference antennas can be estimated during this time.

Note on Interference Between Base Stations

During calibration, one antenna element is active per subcarrier at each point in time (frequency orthogonal pilot design), as compared to 128 antenna elements which are active during normal operation. In that case, the overall transmitted power is reduced by a factor of 128. In addition, there is no beamforming gain as the transmitted signals are frequency orthogonal. That is, the interference to the remaining network is likely minimal.

Summary of Procedure

1. Calibrate the antenna array initially after it is booted. Use many reference antennas.
2. Derive a small reference antenna subset according to the criteria described above.
3. Derive a calibration measurement schedule.
4. Periodic re-calibration.
   a. Based on observing reduced signal quality, e.g., reported by mobile stations.
   b. Based on base station measurements, e.g., temperature changes.
   c. After fixed, but configurable, time intervals d. Signal to mobile terminals the time interval during which no data is being transmitted but a calibration is carried out.
e. Calibrate.
f. Continue with data transmission.

Problem Solved

Many-element antenna arrays, in the order of hundreds of elements per array, are a core component of 5G communications systems. These so called Massive MIMO (Multiple Input Multiple Output) systems utilize time division duplex (TDD) to separate uplink and downlink. A key requirement to implement these systems is to use knowledge about the wireless channel, obtained in the uplink, to precode signals for the downlink transmission. This technique is referred to as "reciprocity-based precoding." Precoding ensures that multiple mobile stations, with only a few antennas each, receive downlink signals without multi-user interference.

Typically, different radio components are used for uplink and downlink transmission at the base station. Their impact needs to be calibrated accurately (reciprocity calibration) such that uplink channel information can be used for downlink precoding. Inaccurate calibration results in multi-user interference in the downlink, i.e., reduced data rates.

Calibration can be implemented base station array-internally by measuring the channel between individual base station array antenna elements. These measurements need to be accurate. Accuracy can be severely reduced if the link between a certain antenna element and a reference antenna element is attenuated, for instance, due to array geometry.

A robust means is provided to calibrate antenna arrays even if the link between some antenna elements and the reference antenna element is very weak.

Figure 5:
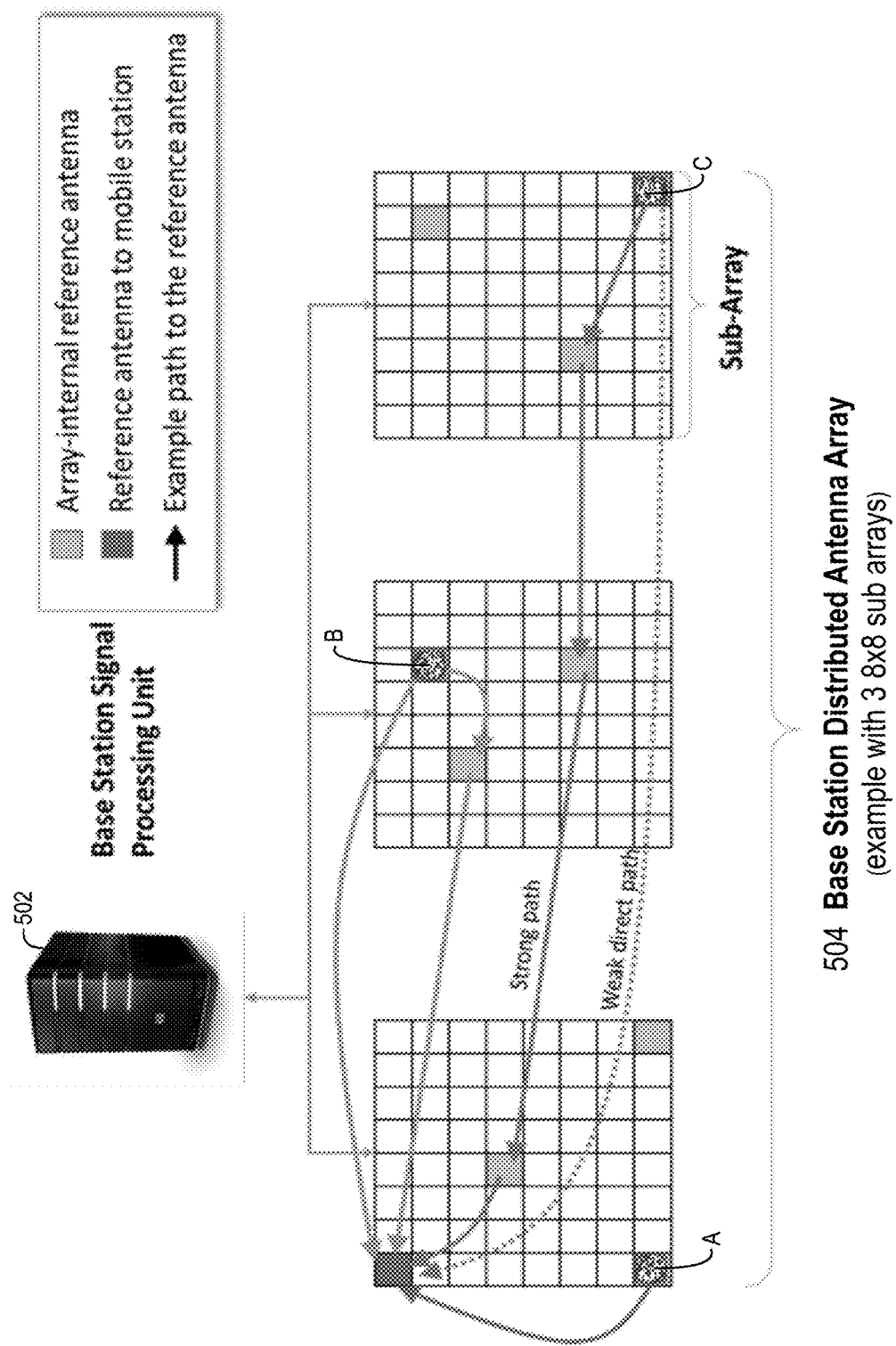
FIG. 5 is a diagram of an example wireless transceiver station architecture with 3 distributed 8×8 antenna sub-arrays connected to a wireless transceiver station signal processing unit.

Referring now to FIG. 5, a diagram of an example wireless transceiver station architecture 500 with 3 distributed 8×8 antenna sub-arrays 504 connected to a wireless transceiver station signal processing unit 502 is shown. The antennas of the antenna array 504 may be exemplary of the antennas 104 of the base station 102 antenna arrays of FIGS. 1 and 2. The processor 502 is programmed to perform the operations described here, e.g., above with respect to FIGS. 1 through 4 and below with respect to FIGS. 6 through 10.

Reciprocity calibration requires estimation of calibration coefficients between all antenna elements (see stippled antenna elements a, b, c in the example of FIG. 5) and a reference antenna to the mobile station (dark gray antenna in upper left-hand corner).

It can be shown that the calibration coefficient between an antenna element and the reference antenna to the mobile station can be decomposed into a concatenation of calibration coefficients between the antenna element and multiple (array-internal) reference antennas (light gray antenna elements in the example of FIG. 5), referred to as a "path" (e.g., path from antenna element c through three array-internal reference antennas to the reference antenna to the mobile station in the upper left-hand corner).

There exist many different paths between an antenna element and the reference antenna to the mobile station (two options are shown for antenna elements b, c). Each path can be used to estimate the calibration coefficient between the antenna element and the reference antenna to the mobile station. The estimates obtained from multiple different paths can be combined to enhance the accuracy of the estimated calibration coefficient. The impact of a weak direct path (e.g. dotted path for antenna element c) can be minimized by using multi-path estimates which comprise strong links between all antenna elements (e.g., normal lines).

Figure 6:
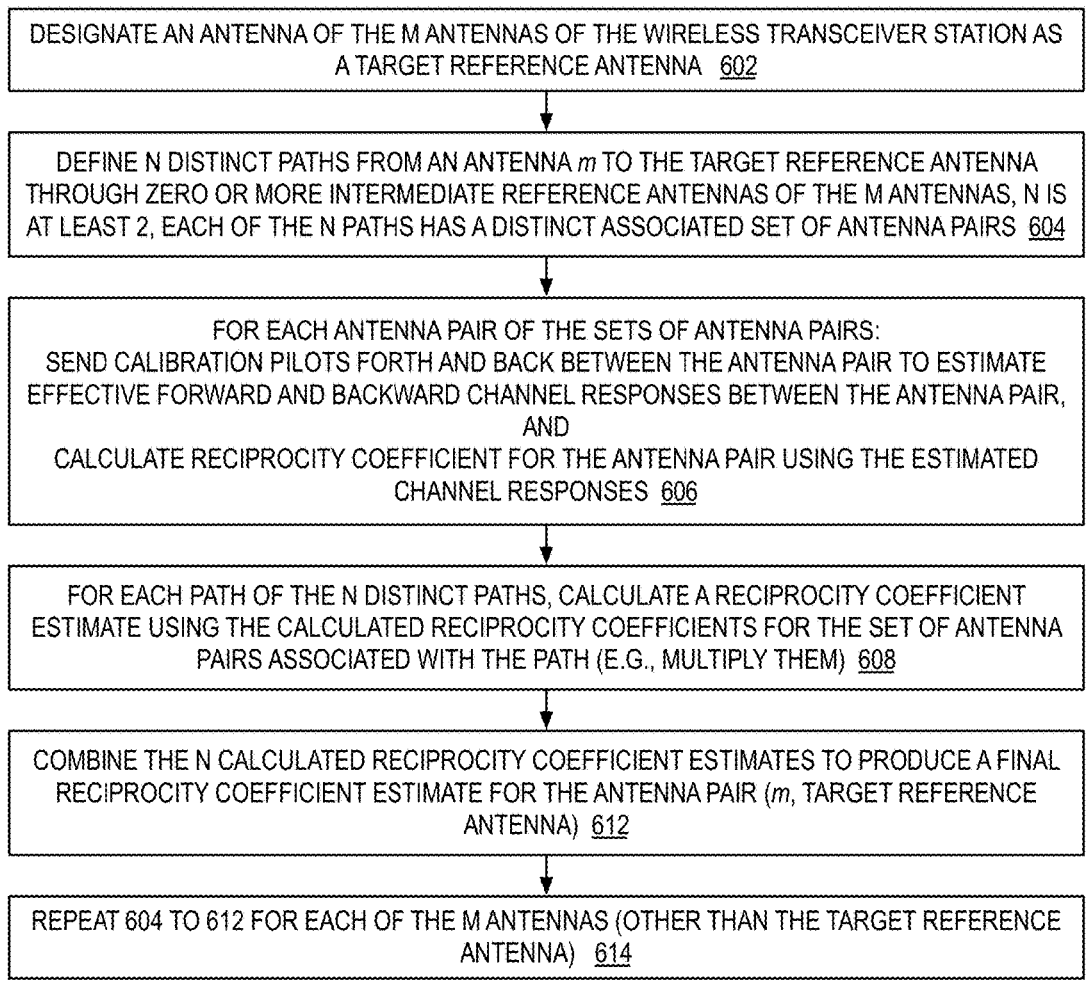

Referring now to FIG. 6, a flowchart illustrating operation of the wireless transceiver station 500 of FIG. 5 is shown. Flow begins at block 602.

At block 602, the wireless transceiver station designates an antenna of the M antennas of the wireless transceiver station (e.g., an antenna 104 of an antenna array such as of the wireless transceiver station 102 of FIG. 1 or FIG. 2 or of wireless transceiver station 500 of FIG. 5) as a target reference antenna. Flow proceeds to block 604.

At block 604, the wireless transceiver station defines N distinct paths from an antenna m to the target reference antenna through zero or more intermediate antennas of the array. N is at least two for each antenna m, and the value of N may be different for a different antenna m. Each of the N paths has a distinct associated set of antenna pairs. Flow proceeds to block 606.

At block 606, the wireless transceiver station performs the following two steps for each antenna pair of the sets of antenna pairs defined at block 604. The wireless transceiver station sends calibration pilots forth and back between the antenna pair to estimate effective forward and backward channel responses between the antenna pair. An example is according to equations (1.23) through (1.26). The wireless transceiver station also calculates a reciprocity coefficient for the antenna pair using the estimated channel responses. An example is according to equation (1.27). Flow proceeds to block 608.

At block 608, for each path of the N distinct paths, the wireless transceiver station calculates a reciprocity coefficient estimate using the reciprocity coefficients calculated for the set of antenna pairs associated with the path. An example is according to equation (1.18), (1.28), (1.45) or (1.58). Flow proceeds to block 612.

At block 612, the wireless transceiver station combines the N calculated reciprocity coefficient estimates to produce a final reciprocity coefficient estimate for antenna pair (m, target reference antenna). An example is according to equations (1.19) through (1.22), (1.29) through (1.34), (1.35) through (1.48), or (1.49) through (1.61). Flow proceeds to block 614.

At block 614, the wireless transceiver station repeats blocks 604 through 612 for each of the M antennas, other than the target reference antenna, whose reciprocity calibration coefficient reduces to a unitary value.

The combined reciprocity coefficient estimates may subsequently be used to perform reciprocity-based transmit precoding, transmit beamforming, and some types of receive beamforming.

Figure 7:
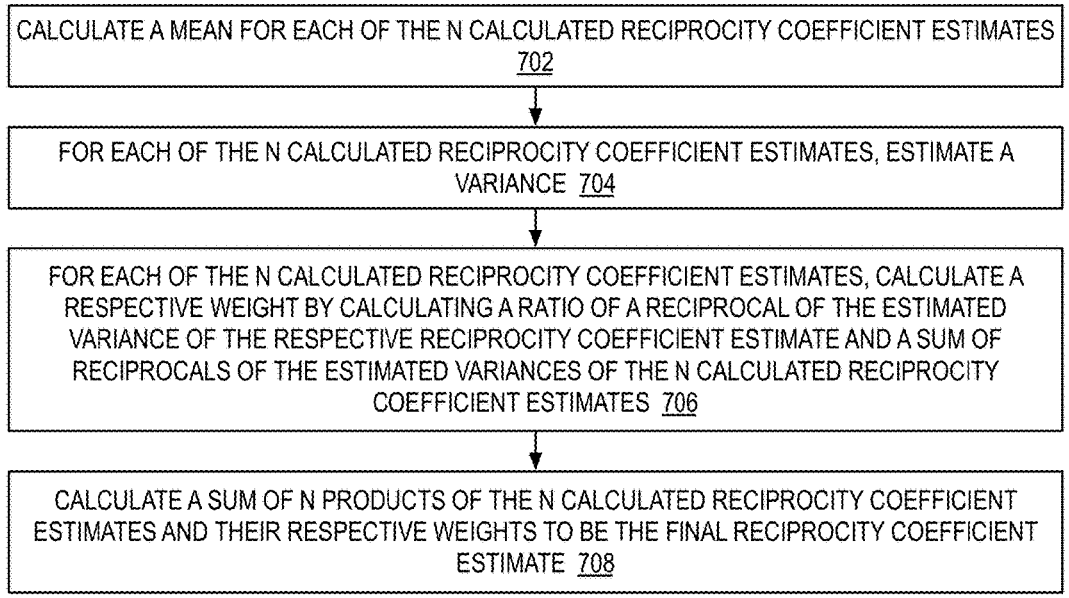

FIG. 7, a flowchart illustrating operation of the wireless transceiver station 500 of FIG. 5 is shown. More specifically, FIG. 7 illustrates in more detail an embodiment of the operation of block 612 of FIG. 6. Flow begins at block 702.

At block 702, the wireless transceiver station calculates a mean for each of the N calculated reciprocity coefficient estimates. An example is according to equation (1.29). Flow proceeds to block 704.

At block 704, the wireless transceiver station estimates a variance for each of the N calculated reciprocity coefficient estimates. An example is according to equation (1.31). Flow proceeds to block 706.

At block 706, the wireless transceiver station, for each of the N calculated reciprocity coefficient estimates, calculates a respective weight. Preferably, the weight is calculated as a ratio of a reciprocal of the estimated variance calculated at block 704 and a sum of reciprocals of the estimated variances of the N calculated reciprocity coefficient estimates.

An example is according to equation (1.22), (1.33), (1.48), (1.56) or (1.61). Flow proceeds to block 708.

At block 708, the wireless transceiver station calculates a sum of N products of the calculated reciprocity coefficient estimates and their respective weights to be the final reciprocity coefficient estimate. An example is according to equation (1.21), (1.32), (1.47), (1.55) or (1.60). Flow ends at block 708.

Figure 8:
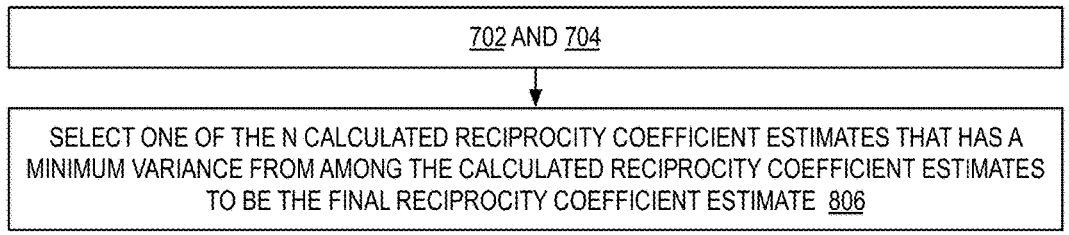

Referring now to FIG. 8, a flowchart illustrating operation of the wireless transceiver station 500 of FIG. 5 is shown. More specifically, FIG. 8 illustrates in more detail an alternate embodiment of the operation of block 612 of FIG. 6. Flow begins at block 702 as in FIG. 7 and further flows to block 704 as in FIG. 7 and then flows to block 806 of FIG. 8.

At block 806, the wireless transceiver station selects one of the N calculated reciprocity coefficient estimates that has a minimum estimated variance (e.g., estimated at block 704) from among the calculated reciprocity coefficient estimates to be the final reciprocity coefficient estimate. An example is according to equation (1.20). Flow ends at block 806.

Figure 9:
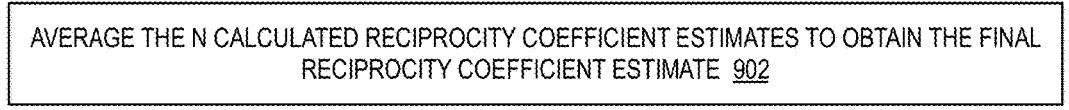

Referring now to FIG. 9, a flowchart illustrating operation of the wireless transceiver station 500 of FIG. 5 is shown. More specifically, FIG. 8 illustrates in more detail an alternate embodiment of the operation of block 612 of FIG. 6. Flow begins at block 902.

At block 902, the wireless transceiver station averages the N calculated reciprocity coefficient estimates (e.g., the N reciprocity coefficient estimates calculated at block 608 of FIG. 6) to obtain the final reciprocity coefficient estimate. An example is according to equation (1.19). Flow ends at block 902.

Referring now to FIG. 10, a flowchart illustrating operation of the wireless transceiver station 500 of FIG. 5 is shown. More specifically, FIG. 10 illustrates in more detail an alternate embodiment of the operation at block 606 of FIG. 6 in which the wireless transceiver station is programmed to transmit and receive on multiple subcarriers, e.g., in an OFDM-based system. Flow begins at block 1002.

At block 1002, the wireless transceiver station performs the following two steps for each antenna pair of the sets of antenna pairs defined at block 604. The wireless transceiver station sends calibration pilots forth and back between the antenna pair on each of a plurality of the multiple subcarriers to estimate an effective forward and backward channel response for the plurality of the multiple subcarriers. An example is according to equations (1.23) through (1.26). The wireless transceiver station also calculates a reciprocity coefficient for the antenna pair for each of the plurality of subcarriers using the effective forward and backward channel responses estimated for each of the plurality of subcarriers. An example is according to equation (1.27). Flow proceeds to block 1004.

At block 1004, the wireless transceiver station averages the calculated reciprocity coefficients over the plurality of subcarriers to obtain a mean reciprocity coefficient estimate for the antenna pair, which is the calculated reciprocity coefficient for the antenna pair (e.g., of block 606). An example is according to equation (1.49). Flow ends at block 1004.

Referring now to FIG. 11, a flowchart illustrating operation of the wireless transceiver station 500 of FIG. 5 is shown. More specifically, FIG. 11 illustrates in more detail an alternate embodiment of the operation at block 608 of FIG. 6 in which the wireless transceiver station is programmed to transmit and receive on multiple subcarriers, e.g., in an OFDM-based system, as in FIG. 10. Flow begins at block 1102.

At block 1102, the wireless transceiver station calculates the reciprocity coefficient estimate using the obtained mean reciprocity coefficient estimate for the set of antenna pairs associated with the path. Equation (1.58) provides an example of calculating a reciprocity coefficient estimate using mean reciprocity coefficient estimates for a set of antenna pairs associated with a path. However, it should be understood that although in equation (1.58) the used mean reciprocity coefficient estimates are determined in the manner described with respect to steps 2 and 3 of the section Detailed Multi-Stage Calibration Procedure—Variant 2, at block 1102 the used mean reciprocity coefficient estimates are not limited to such but may instead be calculated in other manners. Flow ends at block 1102.

Figure 12:
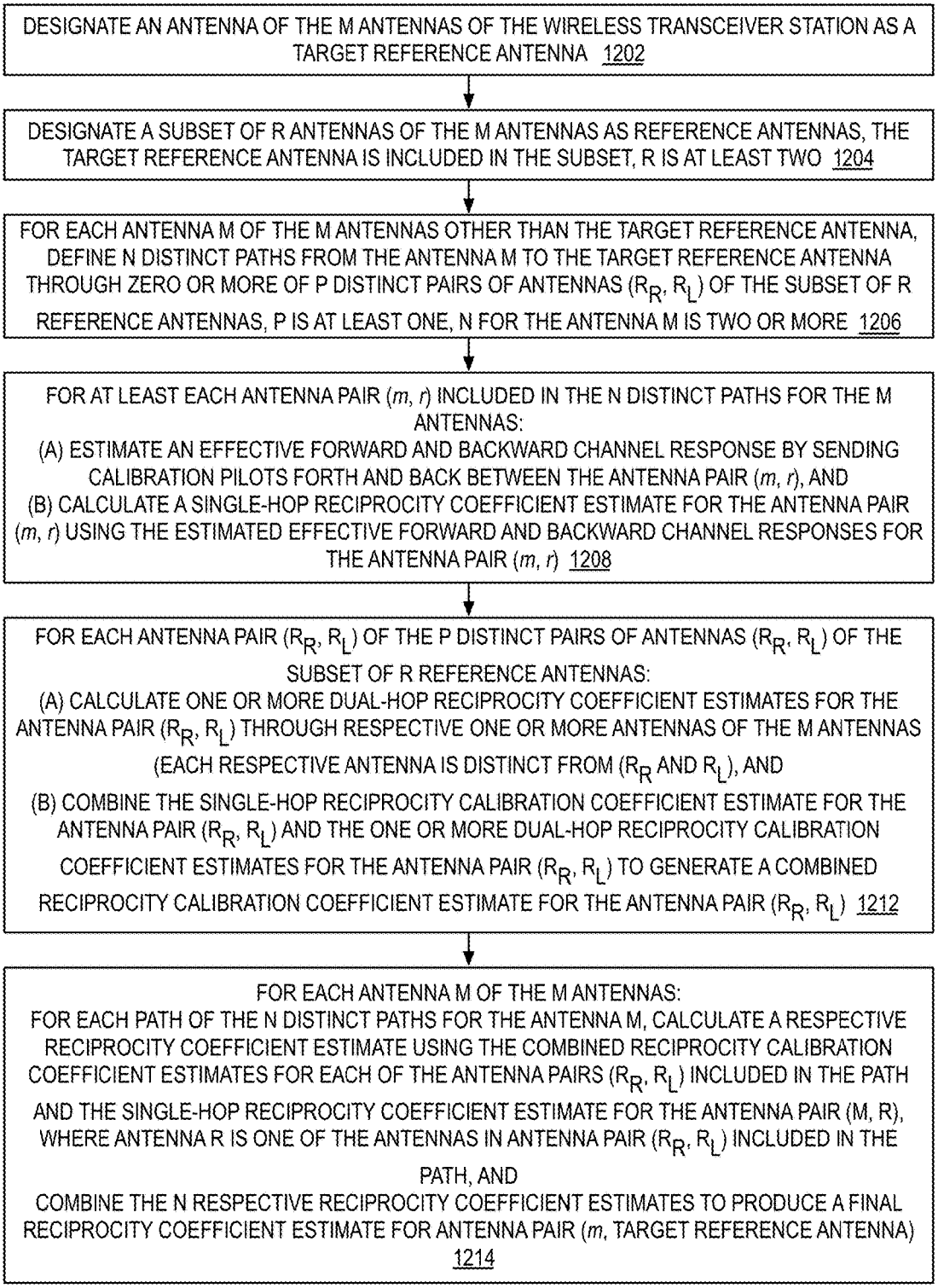

Referring now to FIG. 12, a flowchart illustrating operation of the wireless transceiver station 500 of FIG. 5 is shown. The embodiment described in FIG. 12 is similar in many ways to portions of the description in the section Detailed Multi-Stage Calibration Procedure—Variant 2. Flow begins at block 1202.

At block 1202, the wireless transceiver station designates an antenna of the M antennas of the wireless transceiver station (e.g., an antenna 104 of an antenna array such as of the wireless transceiver station 102 of FIG. 1 or FIG. 2 or of wireless transceiver station 500 of FIG. 5) as a target reference antenna. Flow proceeds to block 1204.

At block 1204, the wireless transceiver station designates a subset of R antennas of the M antennas as reference antennas. The target reference antenna is included in the subset. R is at least two. Flow proceeds to block 1206.

At block 1206, for each antenna m of the M antennas other than the target reference antenna, the wireless transceiver station defines N distinct paths from the antenna m to the target reference antenna through zero or more of P distinct pairs of antennas $(r_r, r_l)$ of the subset of R reference antennas. P is at least one. N for the antenna m is two or more, and the value of N may be different for a different antenna m. Flow proceeds to block 1208.

At block 1208, for at least each antenna pair (m, r) included in the N distinct paths for the M antennas, the wireless transceiver station performs the following two actions. First, (A) the wireless transceiver station estimates an effective forward and backward channel response by sending calibration pilots forth and back between the antenna pair (m, r). An example is according to equations (1.23) through (1.26). Second, (B) the wireless transceiver station calculates a single-hop reciprocity coefficient estimate for the antenna pair (m, r) using the estimated effective forward and backward channel responses for the antenna pair (m, r). An example is according to equation (1.27). Flow proceeds to block 1212.

At block 1212, for each antenna pair $(r_r, r_l)$ of the P distinct pairs of antennas $(r_r, r_l)$ of the subset of R reference antennas, the wireless transceiver station performs the following two actions. First, (A) the wireless transceiver station calculates one or more dual-hop reciprocity coefficient estimates for the antenna pair $(r_r, r_l)$ through respective one or more antennas of the M antennas, where each respective antenna is distinct from $r_r$ and $r_l$. An example is according to equation (1.52). Second, (B) the wireless transceiver station combines the single-hop reciprocity calibration coefficient estimate for the antenna pair $(r_r, r_l)$ and the one or more dual-hop reciprocity calibration coefficient estimates for the antenna pair $(r_r, r_l)$ to generate a combined reciprocity calibration coefficient estimate for the antenna pair $(r_r, r_l)$. An example is according to equation (1.55). Flow proceeds to block 1214.

At block 1214, for each antenna m of the M antennas, the wireless transceiver station performs the following two actions. First, the wireless transceiver station, for each path of the N distinct paths for the antenna m, calculates a respective reciprocity coefficient estimate using the combined reciprocity calibration coefficient estimates for each of the antenna pairs $(r_r, r_l)$ included in the path and the single-hop reciprocity coefficient estimate for the antenna pair (m, r), where antenna r is one of the antennas in antenna pair $(r_r, r_l)$ included in the path. An example is according to equation (1.58). Second, the wireless transceiver station combines the N respective reciprocity coefficient estimates to produce a final reciprocity coefficient estimate for antenna pair (m, target reference antenna). An example is according to equation (1.60). Flow ends at block 1214.

Referring now to FIG. 13, a flowchart illustrating operation of the wireless transceiver station 500 of FIG. 5 is shown. More specifically, FIG. 13 illustrates in more detail an alternate embodiment of the operation at part (B) of block 1208 of FIG. 12 in which the wireless transceiver station is programmed to transmit and receive on multiple subcarriers, e.g., in an OFDM-based system. Flow begins at block 1302.

At block 1302, the wireless transceiver station estimates an effective forward and backward channel response for a plurality of the multiple subcarriers by sending calibration pilots forth and back between the antenna m and the antenna r on each of the plurality of subcarriers. An example is according to equations (1.23) through (1.26). Flow proceeds to block 1304.

At block 1304, the wireless transceiver station calculates a reciprocity coefficient for the antenna pair (m, r) for each of the plurality of subcarriers using the effective forward and backward channel responses estimated for each of the plurality of subcarriers. An example is according to equation (1.27). Flow proceeds to block 1306.

At block 1306, the wireless transceiver station averages the calculated reciprocity coefficients of the antenna pair (m, r) over the plurality of subcarriers to obtain the single-hop reciprocity coefficient estimate for the antenna pair (m, r). An example is according to equation (1.49). Flow ends at block 1306.

Referring now to FIG. 14, a flowchart illustrating operation of the wireless transceiver station 500 of FIG. 5 is shown. More specifically, FIG. 14 illustrates in more detail an alternate embodiment of the operation at part (B) of block 1212 of FIG. 12. Flow begins at block 1402.

At block 1402, for each of the single-hop reciprocity calibration coefficient estimate for the antenna pair $(r_r, r_l)$ and the one or more dual-hop reciprocity calibration coefficient estimates for the antenna pair $(r_r, r_l)$, the wireless transceiver station calculates a respective weight. An example is according to equation (1.56). Flow proceeds to block 1404.

At block 1404, the wireless transceiver station calculates a sum of products of the single-hop reciprocity calibration coefficient estimate for the antenna pair $(r_r, r_l)$ and the one or more dual-hop reciprocity calibration coefficient estimates for the antenna pair $(r_r, r_l)$ and their respective weights to produce the combined reciprocity calibration coefficient estimate for the antenna pair $(r_r, r_l)$. An example is according to equation (1.55). Flow ends at block 1404.

Referring now to FIG. 15, a diagram of antennas illustrating operation according to FIG. 12 to provide a highly reliable reciprocity coefficient estimate for a pair of reference antennas is shown. FIG. 15 illustrates three reference antennas, denoted r1, r2 and r3, and four non-reference antennas, denoted m1, m2, m3 and m4. More specifically, FIG. 15 illustrates the generation of a highly reliable reciprocity coefficient estimate for the antenna pair $(r_2, r_3)$ through the combining of single-hop and dual-hop reciprocity coefficient estimates, e.g., according to equation 1.55 and/or block 1212 of FIG. 12. A single-hop path between r2 and r3 is shown with a dashed arrow. As also shown, multiple dual-hop paths between r2 and r3 through other antennas are shown with solid arrows. More specifically, five dual hop paths are shown between r2 and r3 through m1, m2, m3, m4 and r1. The reciprocity coefficient estimates for these single and dual hop paths may be calculated by equation (1.52), for example. Finally, the single-hop and dual-hop estimates may be combined, e.g., according to equation (1.55), to provide a more reliable reciprocity coefficient estimate for reference antenna pair $(r_2, r_3)$ than an embodiment in which only the single-hop path between reference antennas r2 and r3 is used to calculate the coefficient, particularly if the reference antenna pair (r2, r3) sees a bad wireless channel directly between them. In turn, this may provide a more reliable final reciprocity coefficient estimate for antenna pair (m, target reference antenna) that has one or more of its N paths through antenna pair (r2, r3) and therefore uses the reciprocity coefficient estimate for reference antenna pair (r2, r3) since it is likely the weight associated with the bad single-hop estimate will be relatively small and the weight associated with the good dual hop estimates will be relatively large due to the use of the variances, thereby reducing the effect of the bad wireless channel between antenna r2 and r3 in the combined weighted sum, e.g., of equation (1.55).

Although embodiments are described for estimation of reciprocity coefficients for a multi-antenna cellular base station, other embodiments are contemplated for estimation of reciprocity coefficients for any multi-antenna transceiver system in an efficient and reliable way without a priori knowledge of which antenna pairs have a good connection and which do not. The method and systems are applicable to all multi-antenna techniques that rely on the reciprocity calibration of the antenna elements of a multi-antenna transceiver system. Such techniques can be reciprocity-based transmit precoding, transmit beamforming, and some types of receive beamforming.

It is noted that the techniques described herein can be used for massive MIMO (multiple input, multiple output) cellular telecommunication systems such as those described in U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety. It is further noted that different and/or additional features can also be implemented, as desired, and related systems and methods can be utilized as well. Such massive MIMO communication systems can be used for 5G dynamic TDD (time division duplex) air interfaces. The 5G ($5^{th}$ generation) mobile telecommunications system is able to span a wide variety of deployment scenarios (e.g., Rural, Urban Macro, Dense Urban, Indoor, etc.) in a flexible and scalable manner. In particular, massive MIMO reciprocity-based TDD air interfaces allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC).

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the new frame structures described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for teaching those skilled in the art the manner of carrying out the invention. It is to be understood that the forms of the invention herein shown and described are to be taken as present embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. A wireless transceiver station, comprising:
   M antennas connected to radio transceivers; and
   a processor, programmed to:
   designate an antenna of the M antennas as a target reference antenna; and
   for each antenna m of the M antennas other than the target reference antenna:
   define N distinct paths from the antenna m to the target reference antenna through zero or more intermediate reference antennas of the M antennas, wherein N for the antenna m is two or more;
   wherein each of the N distinct paths has a distinct associated set of one or more antenna pairs of the M antennas;
   for each antenna pair of the sets of antenna pairs:
   estimate an effective forward and backward channel response by sending calibration pilots forth and back between the antenna pair; and
   calculate a reciprocity coefficient for the antenna pair using the estimated channel responses;
   for each path of the N distinct paths:
   calculate a reciprocity coefficient estimate using the reciprocity coefficients calculated for the set of antenna pairs associated with the path; and
   combine the N calculated reciprocity coefficient estimates to produce a final reciprocity coefficient estimate for antenna pair (m, target reference antenna).

2. The wireless transceiver station of claim 1,
   wherein to combine the N calculated reciprocity coefficient estimates to produce a final reciprocity coefficient estimate for antenna pair (m, target reference antenna), the processor is further programmed to:
   for each of the N calculated reciprocity coefficient estimates:
   calculate a respective weight; and
   calculate a sum of N products of the N calculated reciprocity coefficient estimates and their respective weights to produce the final reciprocity coefficient estimate.

3. The wireless transceiver station of claim 1,
   wherein the wireless transceiver station is programmed to transmit and receive on multiple subcarriers;
   wherein to estimate an effective forward and backward channel response by sending calibration pilots forth and back between the antenna pair, the wireless transceiver station is programmed to:
   estimate an effective forward and backward channel response for a plurality of the multiple subcarriers by sending calibration pilots forth and back between the antenna pair on each of the plurality of the subcarriers; and
   wherein to calculate a reciprocity coefficient for the antenna pair using the estimated channel responses, the wireless transceiver station is programmed to:
   calculate a reciprocity coefficient for the antenna pair for each of the plurality of subcarriers using the effective forward and backward channel responses estimated for each of the plurality of subcarriers.

4. The wireless transceiver station of claim 3,
   wherein to calculate a reciprocity coefficient for the antenna pair using the estimated channel responses, the wireless transceiver station is further programmed to:
   average the calculated reciprocity coefficients over the plurality of subcarriers to obtain a mean reciprocity coefficient estimate for the antenna pair, which is the calculated reciprocity coefficient for the antenna pair.

5. The wireless transceiver station of claim 4,
   wherein to calculate a reciprocity coefficient estimate using the reciprocity coefficients calculated for the set of antenna pairs associated with the path, the wireless transceiver station is programmed to:
calculate the reciprocity coefficient estimate using the obtained mean reciprocity coefficient estimates for the set of antenna pairs associated with the path.

6. A wireless transceiver station, comprising:
M antennas connected to radio transceivers; and
a processor, programmed to:
designate an antenna of the M antennas as a target reference antenna;
designate a subset of R antennas of the M antennas as reference antennas, where the target reference antenna is included in the subset, where R is at least two;
for each antenna m of the M antennas other than the target reference antenna:
define N distinct paths from the antenna m to the target reference antenna through zero or more of P distinct pairs of antennas ($r_r$, $r_l$) of the subset of R reference antennas, where P is at least one, where N for the antenna m is two or more;
for at least each antenna pair (m, r) included in the N distinct paths for the M antennas:
estimate an effective forward and backward channel response by sending calibration pilots forth and back between the antenna pair (m, r); and
calculate a single-hop reciprocity coefficient estimate for the antenna pair (m, r) using the estimated effective forward and backward channel responses for the antenna pair (m, r);
for each antenna pair ($r_r$, $r_l$) of the P distinct pairs of antennas ($r_r$, $r_l$) of the subset of R reference antennas:
calculate one or more dual-hop reciprocity coefficient estimates for the antenna pair ($r_r$, $r_l$) through respective one or more antennas of the M antennas, where each respective antenna is distinct from $r_r$ and $r_l$; and
combine the single-hop reciprocity calibration coefficient estimate for the antenna pair ($r_r$, $r_l$) and the one or more dual-hop reciprocity calibration coefficient estimates for the antenna pair ($r_r$, $r_l$) to generate a combined reciprocity calibration coefficient estimate for the antenna pair ($r_r$, $r_l$); and
for each antenna m of the M antennas:
for each path of the N distinct paths for the antenna m, calculate a respective reciprocity coefficient estimate using:
the combined reciprocity calibration coefficient estimates for each of the antenna pairs ($r_r$, $r_l$) included in the path; and
the single-hop reciprocity coefficient estimate for the antenna pair (m, r), where antenna r is one of the antennas in antenna pair ($r_r$, $r_l$) included in the path; and
combine the N respective reciprocity coefficient estimates to produce a final reciprocity coefficient estimate for antenna pair (m, target reference antenna).

7. The wireless transceiver station of claim 6,
wherein the wireless transceiver station is programmed to transmit and receive on multiple subcarriers; and
wherein to calculate a single-hop reciprocity coefficient estimate for the antenna pair (m, r) using the estimated effective forward and backward channel responses for the antenna pair (m, r), the wireless transceiver station is programmed to:
estimate an effective forward and backward channel response for a plurality of the multiple subcarriers by sending calibration pilots forth and back between the antenna m and the antenna r on each of the plurality of subcarriers;
calculate a reciprocity coefficient for the antenna pair (m, r) for each of the plurality of subcarriers using the effective forward and backward channel responses estimated for each of the plurality of subcarriers; and
average the calculated reciprocity coefficients of the antenna pair (m, r) over the plurality of subcarriers to obtain the single-hop reciprocity coefficient estimate for the antenna pair (m, r).

8. The wireless transceiver station of claim 6,
wherein to combine the single-hop reciprocity calibration coefficient estimate for the antenna pair ($r_r$, $r_l$) and the one or more dual-hop reciprocity calibration coefficient estimates for the antenna pair ($r_r$, $r_l$) to generate a combined reciprocity calibration coefficient estimate for the antenna pair ($r_r$, $r_l$), the wireless transceiver station is programmed to:
for each of the single-hop reciprocity calibration coefficient estimate for the antenna pair ($r_r$, $r_l$) and the one or more dual-hop reciprocity calibration coefficient estimates for the antenna pair ($r_r$, $r_l$):
calculate a respective weight; and
calculate a sum of products of the single-hop reciprocity calibration coefficient estimate for the antenna pair ($r_r$, $r_l$) and the one or more dual-hop reciprocity calibration coefficient estimates for the antenna pair ($r_r$, $r_l$) and their respective weights to produce the combined reciprocity calibration coefficient estimate for the antenna pair ($r_r$, $r_l$).

9. A method, comprising:
designating an antenna of M antennas of a wireless transceiver station as a target reference antenna; and
for each antenna m of the M antennas other than the target reference antenna:
defining N distinct paths from the antenna m to the target reference antenna through zero or more intermediate reference antennas of the M antennas, wherein N for the antenna m is two or more;
wherein each of the N distinct paths has a distinct associated set of one or more antenna pairs of the M antennas;
for each antenna pair of the sets of antenna pairs:
estimating an effective forward and backward channel response by sending calibration pilots forth and back between the antenna pair; and
calculating a reciprocity coefficient for the antenna pair using the estimated channel responses;
for each path of the N distinct paths:
calculating a reciprocity coefficient estimate using the reciprocity coefficients calculated for the set of antenna pairs associated with the path; and
combining the N calculated reciprocity coefficient estimates to produce a final reciprocity coefficient estimate for antenna pair (m, target reference antenna).

10. The method of claim 9,
wherein said combining the N calculated reciprocity coefficient estimates to produce a final reciprocity coefficient estimate for antenna pair (m, target reference antenna) comprises:
for each of the N calculated reciprocity coefficient estimates:
calculating a respective weight; and calculating a sum of N products of the N calculated reciprocity coefficient estimates and their respective weights to produce the final reciprocity coefficient estimate.

11. The method of claim 10,
wherein said calculating a respective weight comprises:
using estimated variances of the reciprocity coefficient estimates to calculate the respective weight.

12. The method of claim 11,
wherein said using estimated variances of the reciprocity coefficient estimates to calculate the respective weight comprises:
calculating a ratio of a reciprocal of the estimated variance of the respective reciprocity coefficient estimate and a sum of reciprocals of the estimated variances of the N calculated reciprocity coefficient estimates.

13. The method of claim 9,
wherein said combining the N calculated reciprocity coefficient estimates to produce a final reciprocity coefficient estimate for antenna pair (m, target reference antenna) comprises:
selecting one of the N calculated reciprocity coefficient estimates having minimum variance from among the N calculated reciprocity coefficient estimates.

14. The method of claim 9,
wherein said combining the N calculated reciprocity coefficient estimates to produce a final reciprocity coefficient estimate for antenna pair (m, target reference antenna) comprises:
averaging the N calculated reciprocity coefficient estimates.

15. The method of claim 9,
wherein the wireless transceiver station is programmed to transmit and receive on multiple subcarriers;
wherein said estimating an effective forward and backward channel response by sending calibration pilots forth and back between the antenna pair comprises:
estimating an effective forward and backward channel response for a plurality of the multiple subcarriers by sending calibration pilots forth and back between the antenna pair on each of the plurality of the subcarriers; and
wherein said calculating a reciprocity coefficient for the antenna pair using the estimated channel responses comprises:
calculating a reciprocity coefficient for the antenna pair for each of the plurality of subcarriers using the effective forward and backward channel responses estimated for each of the plurality of subcarriers.

16. The method of claim 15,
wherein said calculating a reciprocity coefficient for the antenna pair using the estimated channel responses further comprises:
averaging the calculated reciprocity coefficients over the plurality of subcarriers to obtain a mean reciprocity coefficient estimate for the antenna pair, which is the calculated reciprocity coefficient for the antenna pair.

17. The method of claim 16,
wherein said calculating a reciprocity coefficient estimate using the reciprocity coefficients calculated for the set of antenna pairs associated with the path comprises:
calculating the reciprocity coefficient estimate using the obtained mean reciprocity coefficient estimates for the set of antenna pairs associated with the path.

18. A method, comprising:
designating one antenna of the M antennas as a target reference antenna;
designating a subset of R antennas of the M antennas as reference antennas, where the target reference antenna is included in the subset, where R is at least two;
for each antenna m of the M antennas other than the target reference antenna:
defining N distinct paths from the antenna m to the target reference antenna through zero or more of P distinct pairs of antennas $(r_r, r_l)$ of the subset of R reference antennas, where P is at least one, where N for the antenna m is two or more;
for at least each antenna pair (m, r) included in the N distinct paths for the M antennas:
estimating an effective forward and backward channel response by sending calibration pilots forth and back between the antenna pair (m, r); and
calculating a single-hop reciprocity coefficient estimate for the antenna pair (m, r) using the estimated effective forward and backward channel responses for the antenna pair (m, r);
for each antenna pair $(r_r, r_l)$ of the P distinct pairs of antennas $(r_r, r_l)$ of the subset of R reference antennas:
calculating one or more dual-hop reciprocity coefficient estimates for the antenna pair $(r_r, r_l)$ through respective one or more antennas of the M antennas, where each respective antenna is distinct from $r_r$ and $r_l$; and
combining the single-hop reciprocity calibration coefficient estimate for the antenna pair $(r_r, r_l)$ and the one or more dual-hop reciprocity calibration coefficient estimates for the antenna pair $(r_r, r_l)$ to generate a combined reciprocity calibration coefficient estimate for the antenna pair $(r_r, r_l)$; and
for each antenna m of the M antennas:
for each path of the N distinct paths for the antenna m, calculating a respective reciprocity coefficient estimate using:
the combined reciprocity calibration coefficient estimates for each of the antenna pairs $(r_r, r_l)$ included in the path; and
the single-hop reciprocity coefficient estimate for the antenna pair (m, r), where antenna r is one of the antennas in antenna pair $(r_r, r_l)$ included in the path; and
combining the N respective reciprocity coefficient estimates to produce a final reciprocity coefficient estimate for antenna pair (m, target reference antenna).

19. The method of claim 18,
wherein the wireless transceiver station is programmed to transmit and receive on multiple subcarriers; and
wherein said calculating a single-hop reciprocity coefficient estimate for the antenna pair (m, r) using the estimated effective forward and backward channel responses for the antenna pair (m, r) comprises:
estimating an effective forward and backward channel response for a plurality of the multiple subcarriers by sending calibration pilots forth and back between the antenna m and the antenna r on each of the plurality of subcarriers;
calculating a reciprocity coefficient for the antenna pair (m, r) for each of the plurality of subcarriers using the effective forward and backward channel responses estimated for each of the plurality of subcarriers; and
averaging the calculated reciprocity coefficients of the antenna pair (m, r) over the plurality of subcarriers to obtain the single-hop reciprocity coefficient estimate for the antenna pair (m, r).

20. The method of claim 18,
wherein said combining the single-hop reciprocity calibration coefficient estimate for the antenna pair ($r_r$, $r_t$) and the one or more dual-hop reciprocity calibration coefficient estimates for the antenna pair ($r_r$, $r_t$) to generate a combined reciprocity calibration coefficient estimate for the antenna pair ($r_r$, $r_t$) comprises:
for each of the single-hop reciprocity calibration coefficient estimate for the antenna pair ($r_r$, $r_t$) and the one or more dual-hop reciprocity calibration coefficient estimates for the antenna pair ($r_r$, $r_t$):
calculating a respective weight; and
calculating a sum of products of the single-hop reciprocity calibration coefficient estimate for the antenna pair ($r_r$, $r_t$) and the one or more dual-hop reciprocity calibration coefficient estimates for the antenna pair ($r_r$, $r_t$) and their respective weights to produce the combined reciprocity calibration coefficient estimate for the antenna pair ($r_r$, $r_t$).

\* \* \* \* \*